(12) United States Patent
Mackin et al.

(10) Patent No.: US 11,724,815 B2
(45) Date of Patent: Aug. 15, 2023

(54) HYBRID ELECTRIC HYDROGEN FUEL CELL ENGINE

(71) Applicant: The Boeing Company, Chicago, IL (US)

(72) Inventors: Steve G. Mackin, Seattle, WA (US); Eric B. Gilbert, Mukilteo, WA (US); Russell H. Higgins, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/575,086

(22) Filed: Jan. 13, 2022

(65) Prior Publication Data

US 2022/0297844 A1  Sep. 22, 2022

Related U.S. Application Data

(60) Provisional application No. 63/137,900, filed on Jan. 15, 2021.

(51) Int. Cl.
| | |
|---|---|
| *F02C 7/36* | (2006.01) |
| *B64D 27/24* | (2006.01) |
| *B64D 27/10* | (2006.01) |
| *B64D 41/00* | (2006.01) |
| *B64C 13/28* | (2006.01) |
| *B64D 47/00* | (2006.01) |
| *F02C 6/20* | (2006.01) |
| *B64C 21/08* | (2023.01) |
| *B64D 27/02* | (2006.01) |

(52) U.S. Cl.
CPC ............ *B64D 27/24* (2013.01); *B64C 13/28* (2013.01); *B64C 21/08* (2013.01); *B64D 27/10* (2013.01); *B64D 41/00* (2013.01); *B64D 47/00* (2013.01); *F02C 6/20* (2013.01); *F02C 7/36* (2013.01); *B64D 2027/026* (2013.01); *B64D 2041/005* (2013.01)

(58) Field of Classification Search
CPC ............... F02C 3/04; F02C 7/32; F02C 7/36
See application file for complete search history.

(56) References Cited

U.S. PATENT DOCUMENTS

| | | | | |
|---|---|---|---|---|
| 6,641,084 B1 * | 11/2003 | Huber | ...................... | H01M 8/00 429/496 |
| 7,986,052 B2 * | 7/2011 | Marconi | ................... | F02C 6/00 180/165 |
| 10,069,150 B2 * | 9/2018 | Mata | ................. | H01M 8/04708 |
| 10,490,832 B2 * | 11/2019 | Manabe | ..................... | F02C 3/04 |
| 10,644,331 B2 * | 5/2020 | Stoia | .................. | H01M 8/04111 |
| 2004/0124308 A1 * | 7/2004 | Daggett | ............ | H01M 8/04089 244/58 |
| 2017/0226934 A1 * | 8/2017 | Robie | ....................... | F02C 7/32 |
| 2019/0323426 A1 * | 10/2019 | Mackin | .................. | B64D 27/10 |

FOREIGN PATENT DOCUMENTS

EP  2604808 A1 *  6/2013  ............. F01D 15/12

* cited by examiner

Primary Examiner — Todd E Manahan
Assistant Examiner — Thuyhang N Nguyen
(74) Attorney, Agent, or Firm — Gates & Cooper LLP

(57) ABSTRACT

A hybrid engine including features to meet aircraft thrust, passenger airflow, and fuel cell requirements. The engine includes a combustor burning the same fuel as the fuel cell. The engine has electric motors to utilize the power output of the fuel cell. The engine shafts have sprags to allow motors to drive the compressors and over run the turbines. The engine has variable flowpath geometry to bypass the combustor.

20 Claims, 20 Drawing Sheets

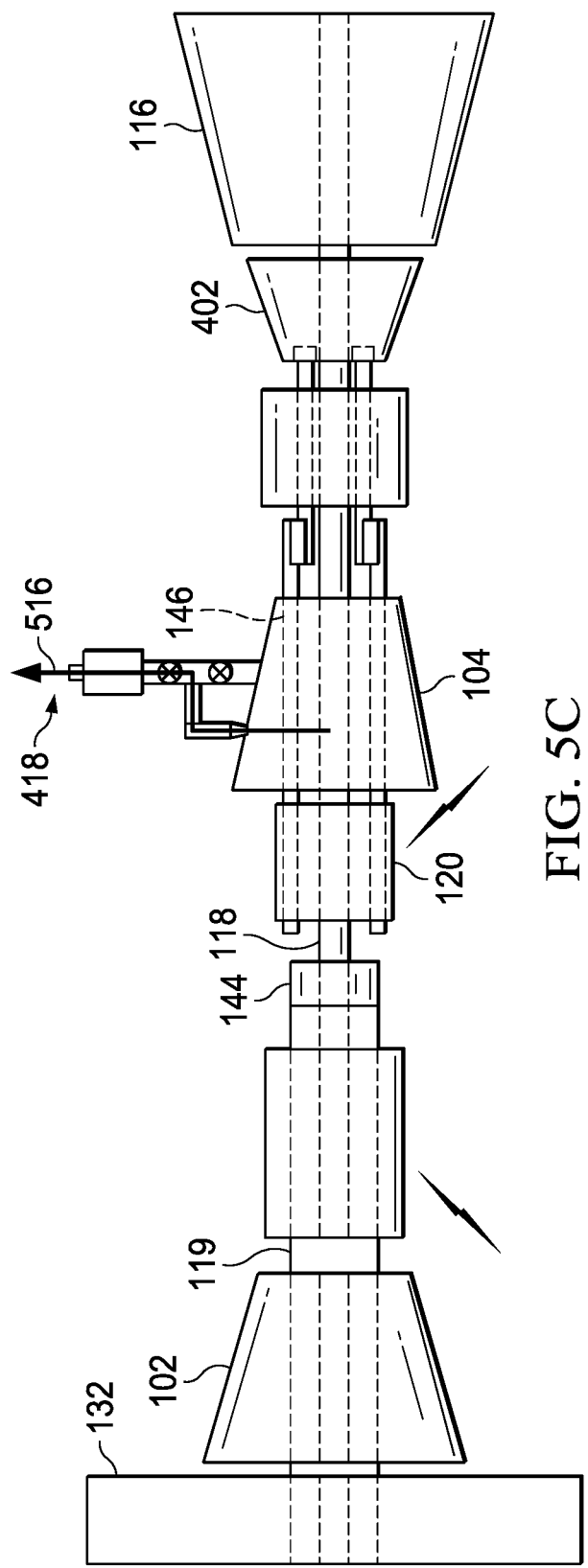

HYBRID ELECTRIC HYDROGEN FUEL CELL ENGINE

CROSS REFERENCE TO RELATED APPLICATIONS

This application claims the benefit under 35 U.S.C. Section 119(e) of commonly-assigned U.S. Provisional Patent Application No. 63/137,900, filed Jan. 15, 2021, by Steve G. Mackin, Eric B. Gilbert, and Russell H. Higgins, entitled "HYBRID ELECTRIC HYDROGEN FUEL CELL ENGINE," which application is incorporated by reference herein.

BACKGROUND

1. Field

The present disclosure relates to propulsion systems and methods of making the same.

2. Description of the Related Art

Aircraft typically include one or more engines to produce thrust. There are many different types or arrangements of engines, such as turbofan engines, turboprop engines, etc. These engines include a propulsor, such as a fan or propeller, for producing thrust and an engine core, such as a gas turbine engine including turbines and compressors, that drives the propulsor. A current trend in propulsor research is manufacture propulsors that reduce or eliminate combustion of fossil fuels (e.g., kerosene) so as to eliminate or reduce undesirable carbon emissions. Such propulsors include electric propulsors and hybrid propulsors including a gas turbine engine and the electric propulsor used together or alternately. Hydrogen is a fuel with zero carbon emissions that can be reacted in an electric propulsor comprising a fuel cell and a conventional gas turbine engine. However, conventional parallel hybrid engines are not configured to assist in fuel cell operation and conventional electric propulsors require a large fuel cell and/or large batteries to handle the larger power outputs required during takeoff and climb of the aircraft. Moreover, burning hydrogen all the time in a conventional gas turbine engine can degrade the turbines. What is needed, then, are improved propulsion systems that operate more efficiently with reduced carbon emission. The present disclosure satisfies this need.

SUMMARY

Illustrative, non-exclusive examples of inventive subject matter according to the present disclosure are described in the following enumerated paragraphs:

A1. An aircraft propulsion system comprising:

a first compressor (e.g., LP compressor);

a second compressor (e.g., HP compressor) coupled to the first compressor to receive a first compressed air outputted from the first compressor and compress the first compressed air into a second compressed air;

a combustor positioned downstream of the second compressor to receive the second compressed air outputted from the second compressor, the combustor outputting a first exhaust gas formed from a fuel burned with the second compressed air;

a turbine positioned downstream of the combustor to receive the first exhaust gas;

a shaft connected to the turbine and the first compressor, the shaft transferring power from the turbine, driven by the first exhaust gas, to the first compressor forming the first compressed air;

an HP electric motor connected to the second compressor; and a fuel cell connected to the HP electric motor, the fuel cell configured to react the second compressed air with the fuel to generate HP electric power used to power the HP electric motor driving the second compressor to form the second compressed air.

A2. The aircraft propulsion system of paragraph A1, further comprising:

a generator connected to the first shaft to generate electric power from the power transferred from the turbine; and a circuit transmitting the electric power from the generator to the HP electric motor to power the HP electric motor driving the second compressor.

A3. The aircraft propulsion system of paragraph A1, further comprising:

a nacelle;

a duct between a core and the nacelle, the core comprising the second compressor, the combustor, and the turbine;

a fan coupled to the first compressor and the duct to draw:

a first portion of air into the duct to generate a second exhaust outputted from the duct, the second exhaust providing a thrust for an aircraft propelled using the aircraft propulsion system, and a second portion of the air into the first compressor, wherein the first compressor compresses the second portion of the air to form the first compressed air inputted to the second compressor.

A4. The aircraft propulsion system of paragraph A3, further comprising:

an LP electric motor;

a first LP shaft connected to the fan and the first compressor;

the shaft comprising a second LP shaft;

an LP clutch connected to the second LP shaft and the first LP shaft; and a first configuration comprising the combustor burning the fuel to form the first exhaust gas and the LP clutch connecting the first LP shaft to the second LP shaft so that the first LP shaft and the second LP shaft transfer the power from the turbine, driven by the first exhaust gas, to the first compressor and the fan; and a second configuration comprising the fuel cell reacting the fuel with the second compressed air, the LP clutch disengaging the first LP shaft from the second LP shaft, and the LP electric motor driving the fan and the first compressor via the first LP shaft.

A5. The aircraft propulsion system of paragraph A4, further comprising:

one or more circuits; and a computer system instructing:

activation of the second configuration during a cruise of the aircraft, the second configuration further comprising the one or more circuits electrically connecting the LP electric motor to the fuel cell and the fuel cell powering the LP electric motor via the one or more circuits, and activation of the first configuration during a take-off of the aircraft.

A6. The aircraft propulsion system of paragraph A1, further comprising:

an LP-HP clutch:

connecting the second compressor to the shaft during a take-off of an aircraft propelled using the aircraft propulsion system, wherein the turbine drives the second compressor via the shaft; and dis-engaging the shaft from the second compressor during a cruise of the aircraft.

A7. The aircraft propulsion system of paragraph A6, further comprising a gearing connected to the second compressor to adjust a torque output of the turbine transferred to the second compressor.

A8. The aircraft propulsion system of paragraph A1, further comprising: one or more clutches:

dis-engaging at least one of the fan, the first compressor, or the second compressor from the shaft in a first configuration, the first configuration further comprising:

the fuel cell reacting the fuel with the second compressed air to generate electric power powering the electric motor driving the second compressor, and the combustor not outputting an amount of first exhaust gas sufficient to generate thrust propelling an aircraft coupled to the aircraft propulsion system;

coupling at least one of the fan, the first compressor, or the second compressor to the shaft in a second configuration further comprising:

the combustor burning the fuel with the second compressed air to generate the first exhaust gas driving the turbine and the turbine driving the second compressor via the shaft.

A9. The aircraft propulsion system of paragraph A8, wherein each of the clutches comprise a sprag clutch.

A10. The aircraft propulsion system of paragraph A9, further comprising:

a diverter regulating flow of the second compressed air outputted from the second compressor into the combustor or the fuel cell.

A11. The aircraft propulsion system of paragraph A10, wherein:

the diverter comprises a valve connected to at least one of the second compressor or the combustor, the valve is open in the first configuration allowing output of the second compressed air to the combustor, and the valve is closed in the second configuration blocking flow of the second compressed air to the combustor.

A12. The aircraft propulsion system of paragraph A11, wherein the valve comprises a sleeve valve or a combustor inlet valve.

A13. The aircraft propulsion system of paragraph A10, further comprising a nozzle directing the first exhaust gas to produce a thrust propelling the aircraft, wherein:

the nozzle includes a variable core nozzle, the diverter comprises the variable core nozzle or a variable turbine nozzle, the diverter is open in the first configuration to allow flow of the first exhaust gas out of the nozzle to produce the thrust, and the diverter is closed in the second configuration to divert the flow of the second compressed air to the fuel cell.

A14. The aircraft propulsion system of paragraph A10, wherein the diverter is positioned:

in the second compressor, or downstream of the second compressor and upstream of the combustor.

A15. The aircraft propulsion system of paragraph A10, wherein the diverter comprises an adjustable vane in, or coupled to, the second compressor, the adjustable vane:

in the second configuration, diverting flow of the second compressed air to the fuel cell and blocking flow of the second compressed air downstream to the combustor, and in the first configuration, allowing flow of the second compressed air downstream to the combustor.

A16. The aircraft propulsion system of paragraph A9, further comprising:

an engine bleed air system coupled to the second compressor;

the second configuration further comprising the engine bleed air system conveying the second compressed air from the second compressor to the fuel cell, or an aircraft system coupled to the engine bleed air system and the engine bleed air system conveying a first portion of the second compressed air to the fuel cell and a second portion of the second compressed air to the aircraft system for pressurizing a cabin in the aircraft.

A17. The aircraft propulsion system of paragraph A16, further comprising the engine bleed air system:

coupled to at least one of the second compressor or the first compressor so as to obtain engine bleed air comprising at least a portion of the second compressed air or the first compressed air, coupled to at least one of:

a low temperature heat exchanger configured to cool at least a portion of the engine bleed air to one or more temperatures suitable for aircraft use; or a fuel heat exchanger configured to transfer heat from the engine bleed air to the fuel comprising liquid hydrogen, so that the heat boils the liquid hydrogen into a gas suitable for burning in the combustor or reaction in the fuel cell to generate the HP electric power.

A18. The aircraft propulsion system of paragraph A10, further comprising:

a nacelle;

a fan coupled to a core comprising the second compressor, the combustor, the turbine, and an HP turbine downstream of the combustor;

a duct between the core and the nacelle;

an LP electric motor connected to the fuel cell;

a plurality of shafts including a first LP shaft, the shaft comprising a second LP shaft, a first HP shaft, and a second HP shaft;

the clutches including an LP clutch and an HP clutch;

the first configuration further comprising:

the LP clutch coupling the first LP shaft and the second LP shaft, the LP turbine, driven by the first exhaust gas, driving the first compressor and the fan via the first LP shaft and the second LP shaft, the HP clutch coupling the first HP shaft and the second HP shaft, and the HP turbine, driven by the first exhaust gas in the first configuration, driving the second compressor via the first HP shaft and the second HP shaft; and the second configuration further comprising:

the LP clutch dis-engaging the first LP shaft and the second LP shaft and the fuel cell powering the LP electric motor to drive the fan so that the fan draws:

a first portion of air into the duct to generate a second exhaust outputted from the duct, the second exhaust providing thrust to an aircraft propelled using the aircraft propulsion system, and a second portion of the air into the first compressor so as to form the first compressed air, the HP clutch disengaging the first HP shaft from the second HP shaft, and the fuel cell powering the HP motor to drive the second compressor via the first HP shaft.

A19. The aircraft propulsion system of paragraph A18, further comprising:
a computer instructing:
activation of the first configuration during at least one of a take-off or climb of the aircraft; and
activation of the second configuration during at least one of a cruise, taxiing, descent, or landing of the aircraft.

A20. The propulsion system of paragraph A18, wherein:
the fan comprises a plurality of first blades and the second compressor comprises a plurality of second blades,
a computer controls a first angular velocity of the plurality of first blades to generate the second exhaust needed for thrust during cruise of the aircraft, and
the computer controls a second angular velocity of the second blades so as to provide sufficient flow and pressure of the second compressed air to the fuel cell needed to generate electric power consumed by the HP electric motor and LP electric motor during the cruise of the aircraft powered using the second exhaust.

A21. The aircraft propulsion system of paragraph A20, wherein the second compressor has a number of compression stages tailored for providing the sufficient flow.

A22. The aircraft propulsion system of paragraph A18, further comprising a gearing connected to the first LP shaft between the first compressor and the fan, the gearing adjusting a torque output of the LP electric motor for driving the fan at a different speed than the first compressor.

A23. The aircraft propulsion system of paragraph A1, wherein the second compressor comprises at least one of a high pressure compressor or an intermediate pressure compressor, and the first compressor comprises a low pressure compressor.

A24. An aircraft comprising the aircraft propulsion system of paragraph A1, further comprising a fuel tank connected to the combustor and the fuel cell, wherein the aircraft propulsion system is configured to generate thrust solely by reacting the fuel with the second compressed air in at least one of the combustor or the fuel cell.

A25. The aircraft of paragraph A24, wherein the fuel comprises hydrogen.

A26. The aircraft propulsion system of any of the paragraphs A1-A5, wherein:
the turbine comprises the single or only turbine in the aircraft propulsion system and the propulsion system does not include an additional HP turbine for driving the second compressor and/or the turbine is not sized or configured to mechanically drive the second compressor directly via an HP shaft.

A27. A method of generating thrust, comprising:
reacting a fuel using compressed air outputted from a compressor in a hybrid gas turbine engine, wherein the reacting is used to generate an exhaust gas providing thrust for an aircraft, the burning further comprising:
reacting the fuel in a fuel cell so as to generate electricity used to power at least one of:
a fan generating thrust during a cruise of the aircraft, or
a high pressure compressor during take-off of the aircraft; and reacting the fuel in a combustor in the gas turbine engine during take-off of the aircraft, so as to generate the exhaust gas through combustion of the fuel.

A28. The method of paragraph A27, further comprising using the exhaust gas to generate electric power used to drive the compressor outputting compressed air to the combustor during a take-off of the aircraft.

BRIEF DESCRIPTION OF THE DRAWINGS

FIG. 5C illustrates an example configuration of the system of FIG. 5B when the combustor is switched off (e.g., during cruise of the aircraft) and the propulsor is entirely powered by a fuel cell.

FIGS. 6B and 6C are cross-sectional views of an overrunning (e.g., sprag) clutch according to one or more examples described herein, wherein FIG. 6B illustrates the clutch engaging two shafts together and FIG. 6C shows the clutch disengaging the two shafts allowing one shaft to overrun the other shaft.

FIGS. 8A and 8B illustrate an example diverter comprising a variable core nozzle having adjustable nozzle walls, wherein FIG. 8A illustrates the open configuration and FIG. 8B illustrates the closed configuration.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

The present disclosure describes propulsion systems including one or more electric motors driving one or more compressors utilizing the power output of a fuel cell. The propulsion system includes one or more shafts coupled to one or more clutches that allow the one or more electric motors to drive the one or more compressors. Various examples of the propulsion system provide a variable flow-path geometry to bypass the combustor in various flight modes when the combustor is de-activated.

Figure 1A:
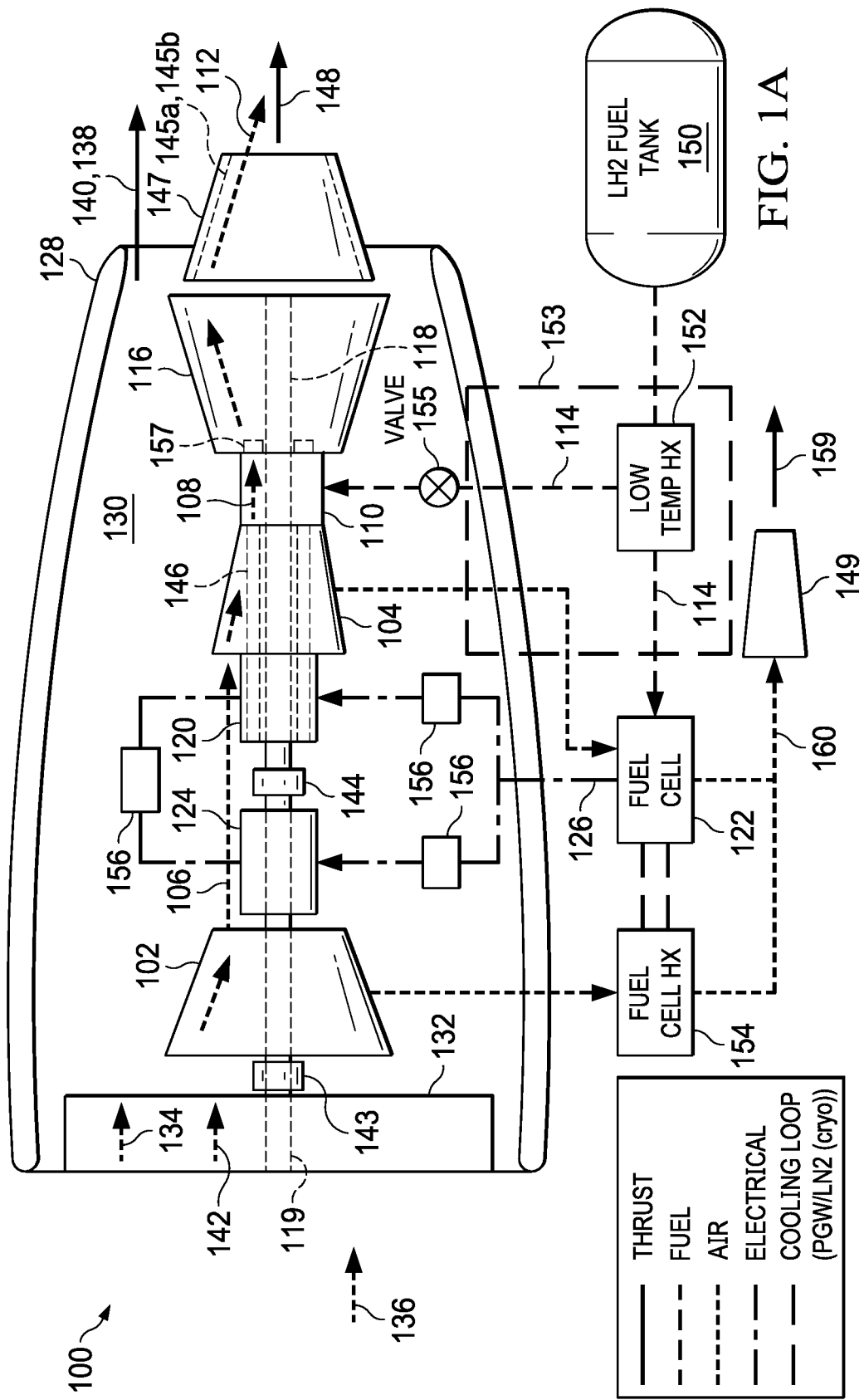
FIG. 1A illustrates a propulsor according to a first example.
Figure 1B:
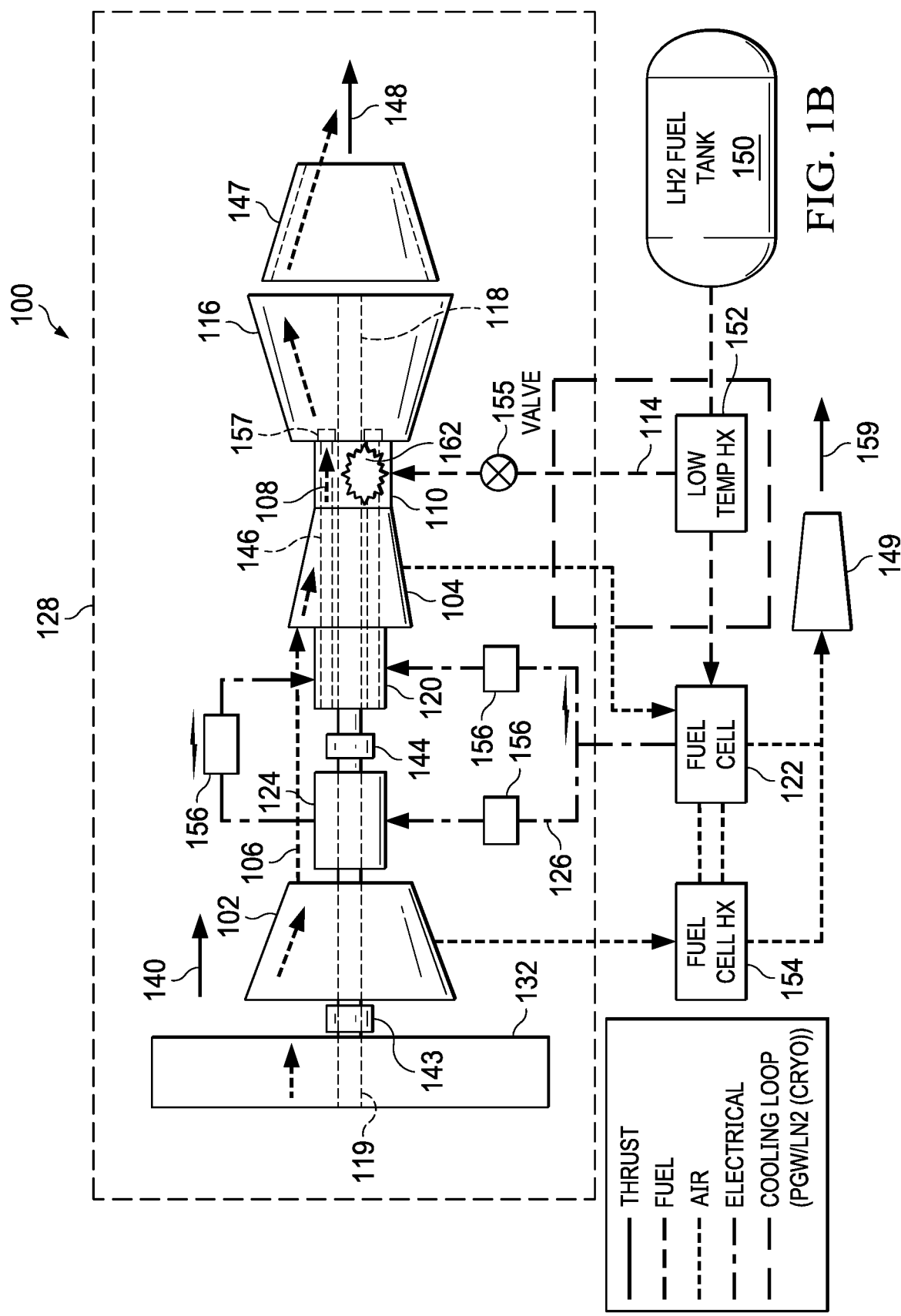
FIG. 1B illustrates an example configuration of the propulsor of FIG. 1A during operation of the combustor (e.g., during take-off and/or climbing of an aircraft).

FIGS. 1A-1B illustrate aircraft propulsion system 100 according to various examples comprise a first compressor 102 and a second compressor 104 coupled or connected to the first compressor 102 to receive a first compressed air 106 outputted from the first compressor 102. The first compressor 102 compresses air with a first compression ratio to form the first compressed air 106 and the second compressor 104 compresses the first compressed air 106 with a second compression ratio higher than the first compressor to form a second compressed air 108. Thus, the first compressor 102 comprises a low pressure compressor or lower pressure compressor (hereinafter denoted LP compressor) outputting the first compressed air comprising a low pressure or lower pressure air (herein after LP compressed air). Furthermore, the second compressor 104 is a high pressure compressor or higher pressure compressor (hereinafter denoted HP compressor) further compressing the LP compressed air 106 into the second compressed air 108 comprising high pressure or higher pressure compressed air (hereinafter HP compressed air) having a higher pressure than the LP compressed air. In one example, LP compressor 102 comprises a low pressure compressor (LPC, also known as a booster) and the HP compressor 104 comprises an intermediate pressure compressor (IP compressor) or a high pressure compressor (HPC).

The aircraft propulsion system 100 typically further comprises a combustor 110 positioned downstream of the HP compressor 104 to receive the HP compressed air 108 outputted from the HP compressor 104. The combustor 110 is configured to output a first exhaust gas 112 formed as product of the combustion 162 of a fuel 114 using the HP compressed air 108. Example fuels include, but are not limited to, hydrogen or other fuel that is also combustible using the HP compressed air 108 in at least one of a fuel cell 122 (to generate electric power) or the combustor 110 to generate the first exhaust gas 112.

The propulsion system further comprises a nacelle 128; a duct 130 between a core and the nacelle, the core comprising the HP compressor 104, the combustor 110, and at least one turbine 116; and a fan 132 coupled to the first compressor 102 and the duct 130. The fan 132 (e.g., main engine fan) draws:

(1) a first portion 134 of air 136 into the duct 130 to generate a second exhaust 138 outputted from the duct 130, the second exhaust providing a fan thrust 140 to an aircraft propelled using the aircraft propulsion system, and (2) a second portion 142 of the air 136 into the first compressor 102 (LP compressor), wherein the first compressor 102 compresses the second portion 142 of the air 136 to form the first compressed air 106 inputted to the second compressor 104 (HP compressor).

In various examples, the fan 132 is coupled to the LP compressor 102 using a planetary gear 143 enabling the fan to be driven at a different gear ratio (and speed) than the LP compressor 102.

The aircraft propulsion system further includes one or more electric machines 120, 124 driving at least one of the HP compressor 104, the LP compressor 102, and the fan 132 utilizing the power output of at least one of fuel cell 122 or the at least one turbine 116. Example electrical machines include, but are not limited to, at least one of a motor-generator, a motor coupled to a generator, a dynamotor, or a motor. The propulsion system further includes shafts coupled to one or more clutches 144 (e.g., sprag clutches) that allow the electric machines to drive the compressors and overrun the at least one turbine. In various examples, the shafts include a first shaft (LP shaft 1, 119) connecting the fan 132 and the LP compressor 102 to an LP electric machine 124, a second shaft (LP shaft 2, 118) connected to the at least one turbine 116, and an HP shaft 146 connecting a an HP electric machine (e.g., HP motor 120) to the HP compressor 104. In various examples, the one or more clutches include an LP clutch 144 connecting the LP shaft 1 119 to the LP shaft 2 119. In some examples, LP shaft 1 (119) and LP shaft 2 (118) are each a single shaft. In other examples each of the LP shaft 1 and LP shaft comprise multiple shafts allowing connection between the turbine 116, the first compressor 102, and the fan 132. In various examples, HP shaft 146 comprises a single shaft or multiple shafts connecting the HP electric machine to the HP compressor 104. In one or more examples, the HP shaft 146 is positioned concentrically about a section of LP shaft 2 (118) so that LP shaft 2 passes through a hollow central portion of the HP shaft 146.

The aircraft propulsion system is configured for a hybrid (e.g., parallel hybrid) propulsion operated in a combustor mode or a non-combustor mode. In the combustor mode, the combustor 110 combusts or burns the fuel 114 using the HP compressed air 108 to generate combustion products comprising the first exhaust gas 112. During the non-combustor mode, the combustor is de-activated or switched off (and not burning the fuel) and one or more components of the aircraft propulsion system (at least one of the fan 132, the first compressor 102, and the second compressor 104) are driven using one or more electric machines 120, 124. Examples of operation phases or operation modes of an aircraft propelled using the aircraft propulsion system in the combustor mode include at least one of take-off or climbing of the aircraft. Examples of operation phases or modes of an aircraft propelled using the aircraft propulsion system in the non-combustor mode include at least one of taxiing, cruise, or descent of the aircraft.

The aircraft propulsion system 100 further includes a first nozzle 147 downstream of the combustor 110 and the turbine 116 and exhausting the first exhaust gas 112. The first exhaust gas 112 outputted from the first nozzle 147 provides a core thrust 148 for an aircraft propelled using the propulsion system. The propulsion system 100 includes one or more diverters 157 (e.g., a variable turbine nozzle 145a or variable core nozzle 145b) to bypass, regulate, or control (e.g., divert) a flowpath of the HP compressed air 108 at one or more locations in, downstream of, or at an output of, the HP compressor depending on the operation mode of the aircraft. When the combustor 110 is switched off (non-combustor mode), the diverter 157 (e.g., nozzle 145a, 145b closed) prevents or blocks flow the HP compressed air 108 at one or more locations downstream of the HP compressor 104, enabling diversion of the HP compressed air 108 to the fuel cell 122. When the combustor is operating (e.g., in combustor mode), the diverter 157 (e.g., open nozzle 145a, 145b) allows flow of the HP compressed air 108 into the combustor 110 and/or flow of the first exhaust gas out of the combustor 110, through the turbine 116 and out of the first nozzle 147 to generate the core thrust 148.

As used herein, the prefix HP is used to denote a part (e.g., shaft, compressor, clutch, or electrical machine) used in connection with driving a higher pressure (HP) compressor 104 and the prefix LP is used to denote a part (e.g., shaft, compressor, clutch, or electrical machine) used in connection with driving a lower pressure (LP) compressor 102 or fan 132, such that the LP compressor 102 or fan 132 outputs LP compressed air 106 having a lower compression or lower pressure than the HP compressed air 108 outputted from the HP compressor 104.

As used herein, driving or powering a motor, shaft, compressor, or turbine includes spinning the motor (or rotor of the motor), the shaft, or rotor shaft (including compressor blades) of the compressor, or rotor shaft (including turbine blades) of the turbine, respectively.

As used herein a fuel cell includes a device that reacts the fuel (comprising hydrogen or other fuel compatible with the fuel cell) using at least a portion of the HP compressed air outputted from the HP compressor to generate electricity comprising electric power. A fuel cell includes one or more fuel cells or a fuel cell stack.

As used herein, a clutch coupling two shafts includes the clutch connecting (e.g., locking) the two shafts so that mechanical rotational power is transferred between the two shafts.

As used herein, two or more components may be described as being coupled or connected to one another. The desired definition is that element A coupled to/connected to B is defined as either A directly or indirectly connected to B, including coupled or connected through one or more intervening elements such as, but not limited to a clutch, e.g., the clutch transferring power between element A and element B when the clutch engages or couples element A to element B but not transferring power between element A and element B when the clutch dis-engages or de-couples element A from element B.

Various examples of the propulsion system are described in the following sections.

1. First Example Propulsion System

Figure 1C:
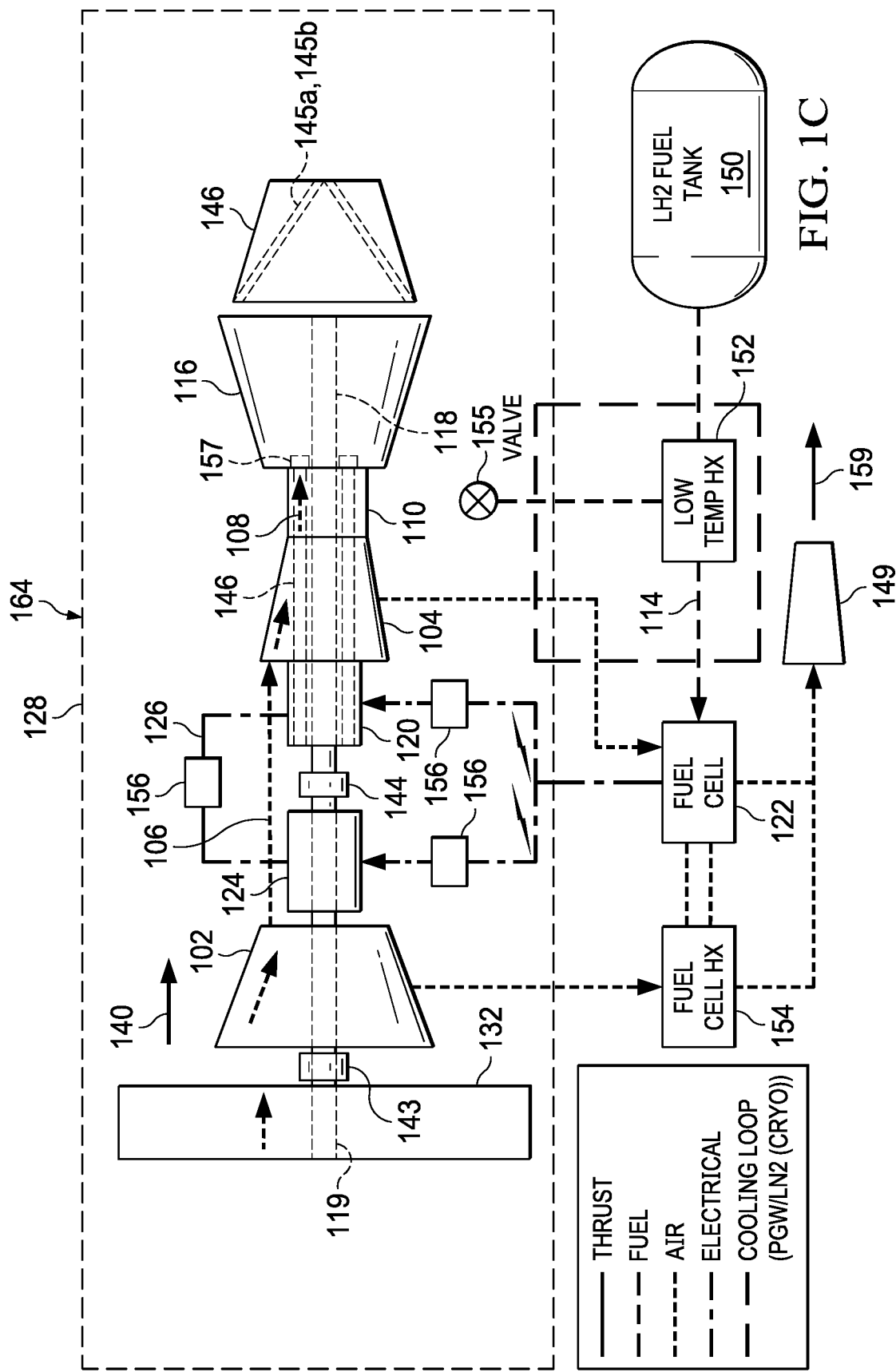
FIG. 1C illustrates an example configuration of the propulsor of FIG. 1A when the combustor is switched off (e.g., during cruise of an aircraft) and the propulsor is entirely powered using a fuel cell.

FIG. 1A-1C illustrate an example of the propulsion system 100 including the fan 132, LP compressor 102, the HP compressor 104, and combustor 110 and wherein the turbine includes a single turbine 116 positioned downstream of the combustor 110 to receive the first exhaust gas 112. When the LP clutch 144 couples LP shaft 1 (119) to the LP shaft 2 (118), LP shaft 1 and the LP shaft 2 transfer power from the turbine 116, driven by the first exhaust gas 112, to the LP compressor 102 to power compression of the air 136 into the LP compressed air 106 and power the fan 132 to draw the first portion 134 of the air 136 into the duct 130.

FIG. 1A-1C further illustrate the propulsion system 100 includes an LP electrical machine 124 converting between electrical power and mechanical power. In one configuration, the first exhaust gas 112 outputted from the combustor 110 drives the turbine 116 with mechanical rotational power that is transferred via LP shaft 2 (118) and LP shaft 1 (LP shaft 1 and LP shaft 2 coupled by the LP clutch 144) to the LP electrical machine 124, and the LP electrical machine 124 (e.g., comprising a generator) converts at least a portion of the mechanical rotational power to electrical power that can be used to power one or more aircraft systems (including the HP compressor, as discussed below). In this configuration, the LP electrical machine still allows transfer of at least a portion of the mechanical rotational power via LP shaft 1 (119) to drive the fan 132 and the LP compressor 102. In another configuration, the LP electric machine comprises a motor driving the fan 132 and/or the LP compressor 102 when the LP clutch 144 dis-engages LP shaft 1 from LP shaft 2, thereby disconnecting the turbine 116 from the fan 132 and the LP compressor 102.

The propulsion system 100 further comprises an electric motor 120 (designated HP motor) driving the HP compressor 104 via the HP shaft 146 so that the HP compressor 104 compresses the LP compressed air 106 into the HP compressed air 108. The HP motor 120 is powered (or driven) by the electric power generated in at least one of the LP electric machine 124 or the fuel cell 122. As described above, the LP electric machine 124 is configured to convert at least a portion of the mechanical rotational power transferred from the turbine to the electrical power for powering the HP motor 120. In another example, the fuel cell 122 reacts the fuel 114 using at least a portion of the HP compressed air 108 outputted from the HP compressor 104 to generate the electric power powering the HP motor 120 to drive HP compressor 104. One or more circuits 126 controlled by one or more computers or controllers 156 control transmission of the electric power from the fuel cell and/or the LP electrical machine 124 to drive the HP motor 120.

FIG. 1A-1C further illustrates the propulsion system 100 includes a fuel valve 155 controlling flow of the fuel 114 along fuel lines from a fuel tank 150 and into the fuel cell 122 or the combustor 110. In the example shown, the fuel 114 comprises hydrogen stored in the tank comprising a liquid hydrogen storage tank 150 and fuel heat exchanger 154 is coupled to the compressor bleed outlet of the first compressor 102 or the second compressor 104 so as to boil the liquid hydrogen into gas suitable to be burned in the combustor or reacted in the fuel cell. Specifically, the fuel heat exchanger 154 transfers heat from hot compressor offtakes (outputting a tapped portion of the first compressed air 106 and/or a tapped portion of the second compressed air 108) to boil the fuel into the gas. Also shown is a low temperature heat exchanger 152 used to cool the tapped portion of the hotter first compressed air 106 or the tapped portion of hotter second compressed air 108 to a temperature suitable for aircraft use (e.g., in the cabin or air conditioning system). In various examples, the compressor bleed outlet comprises a hot compressor offtake including or coupled to an engine bleed air system. FIG. 1A further illustrates a cooling loop 153 used to precool the compressed air 108, 106 or to cool hot engine components.

The propulsion system further includes a second nozzle 149 to exhaust 160 water or water vapor outputted from the fuel cell 122, the water or water vapor comprising a product of the reaction of the hydrogen and the HP compressed air 108 in the fuel cell 122. The exhaust 160 is cooled in a fuel cell heat exchanger 154 by combination with a portion of the LP compressed air 106 outputted from the LP compressor 102. The exhaust 156 through the second nozzle 149 provides supplemental or additional thrust 159 for the aircraft powered by the propulsion system 100.

a. Example Propulsion System Operation During Combustor Mode

FIG. 1B illustrates an operation of the propulsion system 100 during the combustor mode when the combustor 110 is burning the fuel 114 using the HP compressed air 108 so as to form the first exhaust gas 112 driving the turbine 116. The LP clutch 144 couples LP shaft 2 (118) to the LP shaft 1 (119) so that the turbine 116 drives the LP compressor 102 and the fan 132 via the LP shaft 1 and LP shaft 2. As a result, most or all of the power powering LP compressor 102 and the fan 132 is generated from the first exhaust gas 112 driving the turbine 116. The LP shaft 2 driven by the turbine 116 also drives the LP electrical machine 124 to generate the electric power (converted from the mechanical rotational power received from the turbine 116) used to power the HP motor 120. The HP motor 120 drives the HP compressor 104 via the HP shaft 146. In some examples, supplemental electric power from the fuel cell 122 is also used to power the HP motor 120 driving the HP compressor. As illustrated in FIG. 1B, the one or more diverters 157 (comprising variable core nozzle 145b and/or variable turbine nozzle 145a) are open to allow flow of the first exhaust gas 112 out of the first nozzle 147 to provide the core thrust 148.

b. Example Propulsion System Operation During Non Combustor Mode (Electric Mode)

FIG. 1C illustrates an operation of the propulsion system 100 in a non-combustor mode (electric mode) when the combustor 110 is switched off. Flow of the fuel 114 to the combustor is switched off by the fuel valve 155 and flow of the HP compressed air 108 at one or more locations downstream of the HP compressor is blocked by the diverter 157 (e.g., closure of nozzle 145a, 145b). The HP compressor 104 is driven by the HP electric motor 120 powered by the fuel cell 122. The LP clutch 144 de-couples (e.g., disengages) LP shaft 2 (118) from LP shaft 1 (119) so that the LP compressor 102 and the fan 132 are driven by the LP electrical machine 124 via LP shaft 1 (119), e.g., overrunning LP shaft 2).

2. Second Example: Non-Coaxial Arrangement of the Electrical Machines

Figure 2:
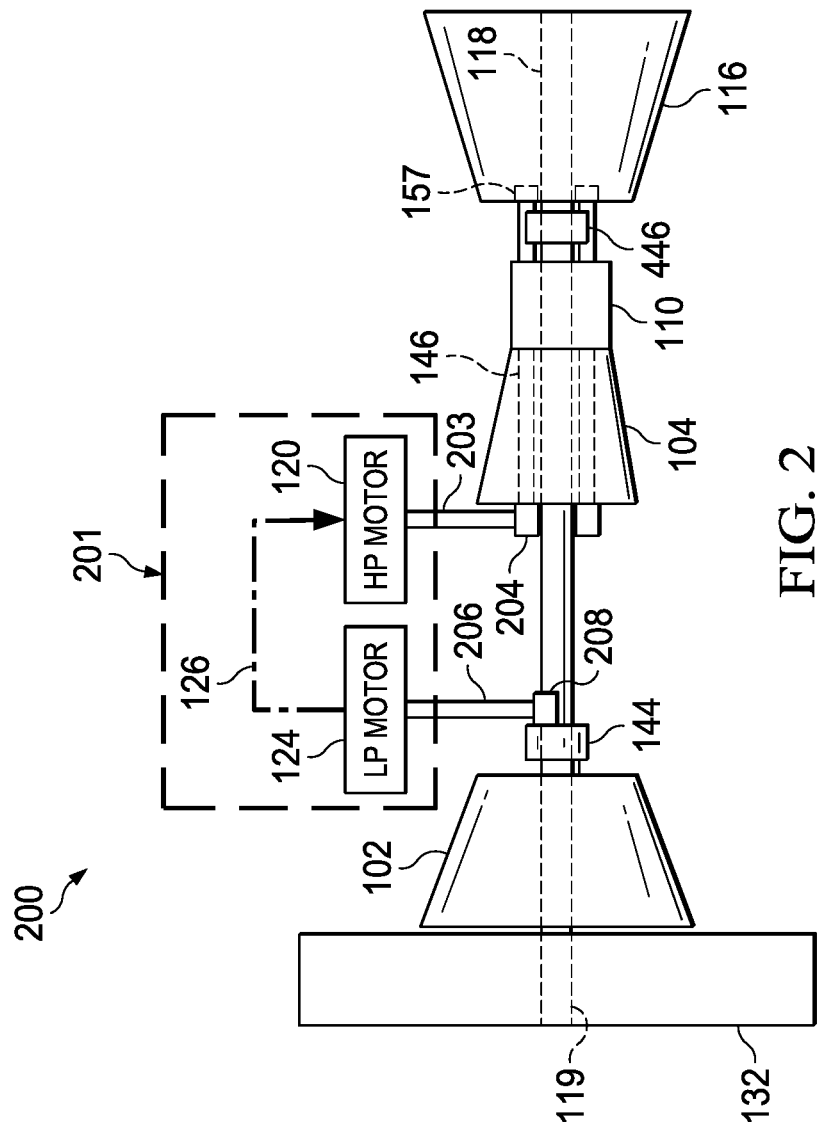
FIG. 2 illustrates an example propulsor comprising a non-coaxial arrangement of motors.

FIG. 2 illustrates a propulsion system 200 comprising a non-coaxial arrangement 201 of the LP electrical machine 124 and the HP motor 120. The HP motor 120 drives the HP shaft 146 via HP drive shaft 203 and HP gear box 204, and the LP electrical machine 124 drives LP shaft 1 (119) via LP drive shaft 206 and LP gear box 208. In the example shown, the LP clutch 144 is located on a section of the LP shaft 1 (119) downstream of the combustor 110. In one or more examples, the non-coaxial arrangement 202 is configured to shorten a length of the propulsion system and/or improve a flow path of the LP compressed air 106 and HP compressed air 108 through the propulsion system 200.

3. Third Example: Multiple Clutch Propulsion System

Figure 3:
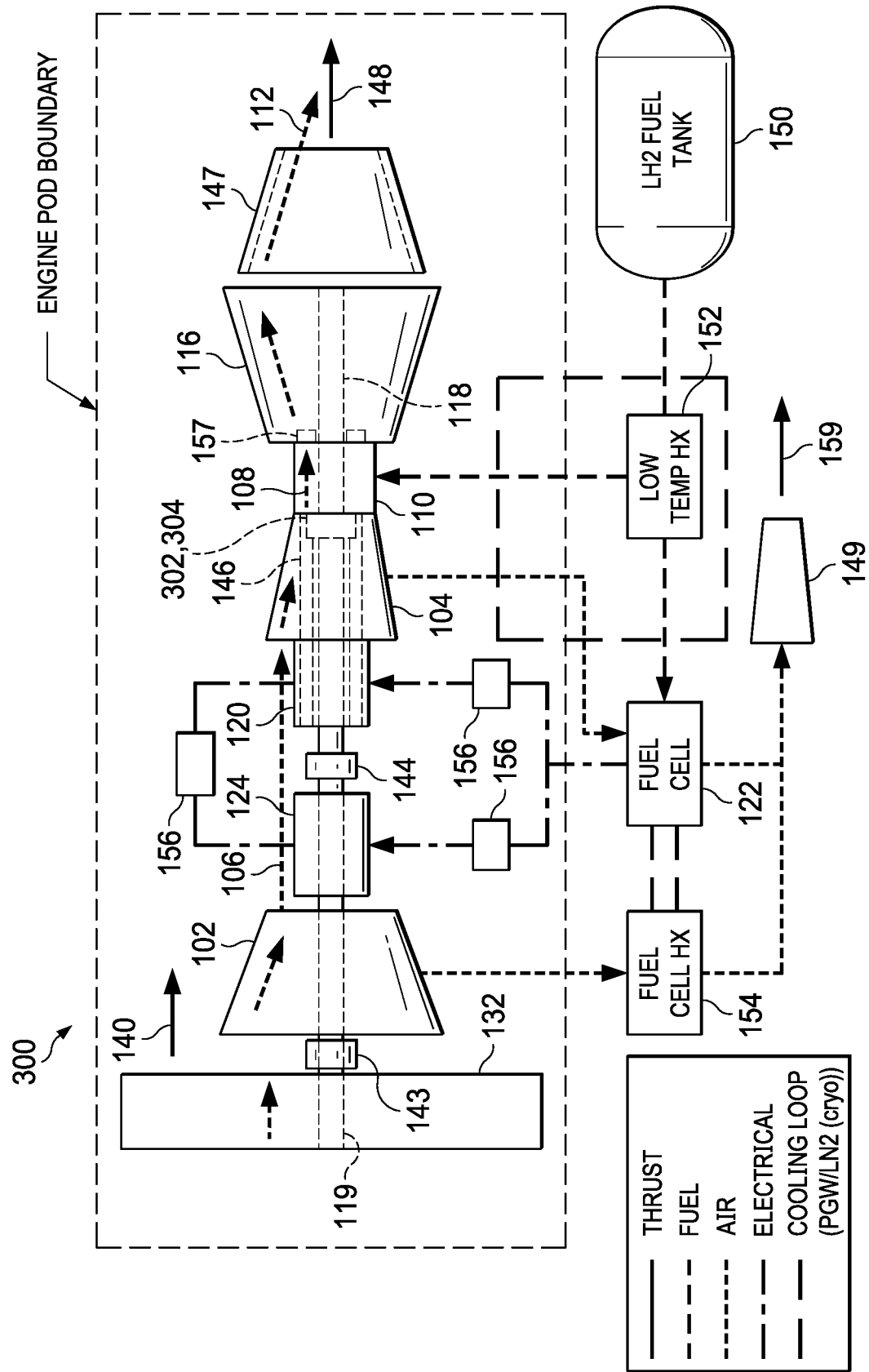
FIG. 3 illustrates an example propulsor including multiple clutches.

FIG. 3 illustrates a propulsion system 300 including the fan 132, first compressor 102, second compressor 104, combustor 110, turbine 116, fuel cell 122, HP motor 120, and at least one of an LP to HP gearbox 302 or LP-HP clutch 304 connecting the LP shaft 2 (118) and the HP shaft (146). In various examples, the LP to HP gearbox 302 includes the LP-HP clutch 304 and a gearing system. In one example, the LP to HP gearbox 302 or LP-HP clutch 304 connects sections of the LP shaft 2 (118) and HP shaft 146 in the HP compressor 104 or between the combustor 110 and the HP compressor 104. The LP-HP clutch 304:

(1) de-couples or dis-engages the HP shaft 146 from the LP shaft 2 (118) allowing the HP shaft 146 to overrun the LP shaft 2 (118) during operation of the propulsion system 100 in the non-combustor mode, and (2) couples or engages the HP shaft 146 to the LP shaft 2 (118) so that the HP shaft 146 is driven by the turbine 116 via LP shaft 2 (118) when the turbine 116 is actively being driven by the first exhaust gas 112 during combustor mode operation of the propulsion system 300.

In various examples, the LP-HP clutch 304 comprises a sprag clutch. In some examples, a configuration of the propulsion system 300 including the LP-HP clutch 304 enables the HP motor 120 to be significantly downsized while avoiding the need for a second turbine (HP turbine).

4. Fourth Example: Propulsion System Including Multiple Turbines

Figure 4:
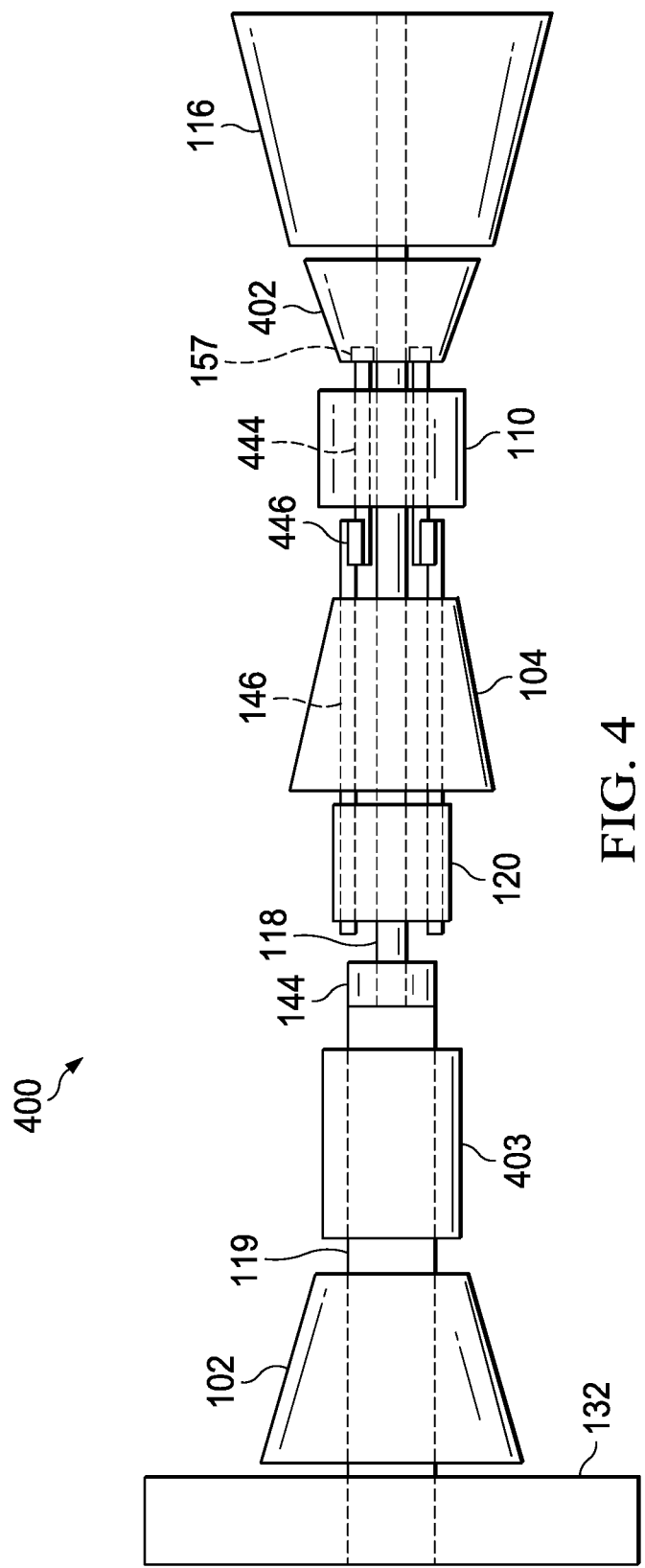
FIG. 4 illustrates an example propulsor including multiple turbines.

FIG. 4 illustrates an aircraft propulsion system 400 according to a fourth example comprising the LP compressor 102, HP compressor 104, combustor 110, a first turbine 116 (e.g., LP turbine), LP shaft 1 (119), LP shaft 2 (118), LP clutch 144 connecting LP shaft 1 and LP shaft 2; a second turbine 402 (e.g. HP turbine) positioned downstream of the combustor to receive the first exhaust gas (LP turbine 116 downstream of HP turbine); a first HP shaft 146 connecting the HP motor to the HP compressor, and a second HP shaft 444 (HP shaft 2) connecting the HP turbine to the HP shaft 2 via an HP clutch 446.

When the combustor 110 is burning fuel 114 and generating first exhaust gas 112 in the combustor mode, the HP clutch 446 couples the HP shaft 2 (444) to HP shaft 1 (146) and the LP clutch 144 couples the LP shaft 1 (119) to the LP shaft 2 (118) so that:

(1) the HP turbine 402, driven by the first exhaust gas 112, drives the HP compressor 104 via HP shaft 2 (444) and HP shaft 1 (146); and (2) the LP turbine 116, driven by the first exhaust gas 112, drives the LP compressor 102 and the fan 132 via LP shaft 1 (119) and LP shaft 2 (118).

The propulsion system further includes the LP electric machine 124 comprising an LP motor 403. When the combustor is de-activated (non-combustor mode or electric mode):

(1) the LP clutch 144 de-couples (or dis-engages) LP shaft 1 (118) from LP shaft 2 (119) and the LP motor 403 drives the fan 132 and the LP compressor 102 via LP shaft 1 (e.g., overrunning LP shaft 2), and (2) the HP clutch 446 de-couples or disengages the HP shaft 1 (146) from the HP shaft 2 (444) and the HP motor 120 drives the HP compressor 104 via HP shaft 1 (e.g., overrunning HP shaft 2).

The LP motor 403 and the HP motor 120 are powered using the electric power generated in the fuel cell 122 reacting the fuel using the HP compressed air 108.

5. Fifth Example: Connection to an Engine Bleed Air System

Figure 5A:
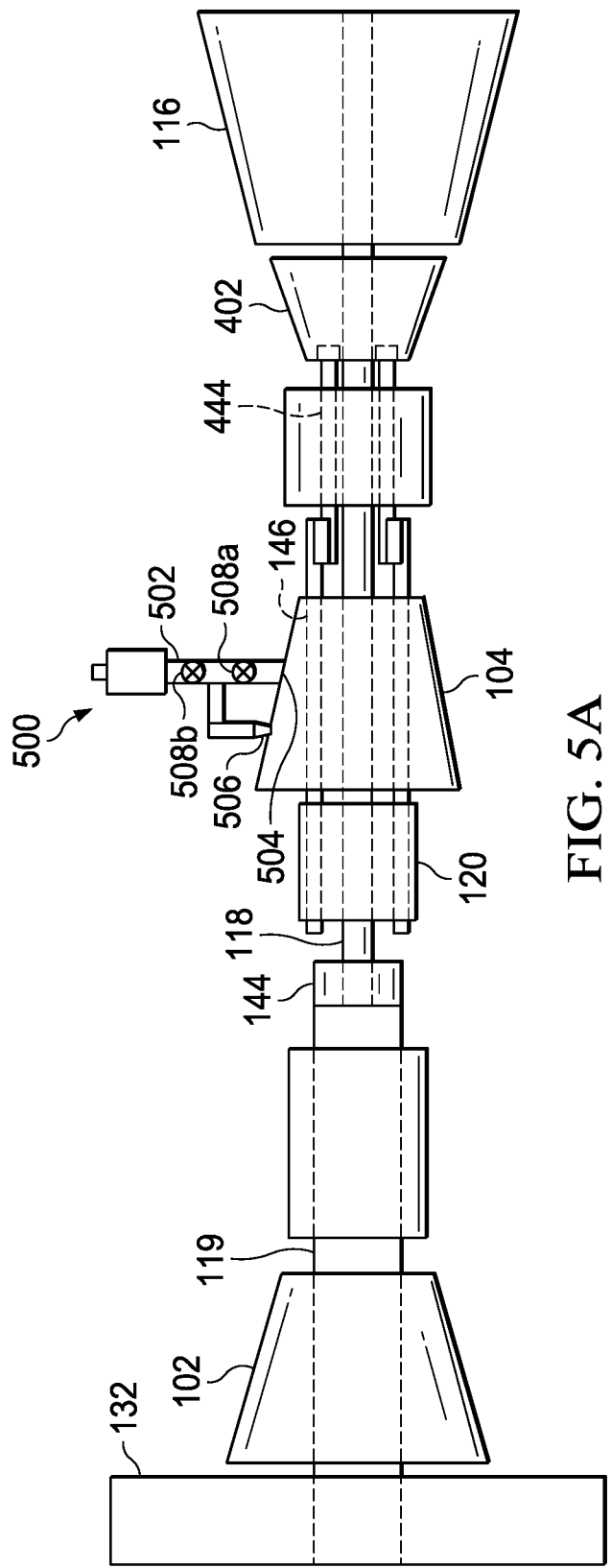
FIG. 5A illustrates an engine bleed air system coupled to a propulsor.

FIG. 5A illustrates the aircraft propulsion system of FIG. 4 further comprising an engine bleed air system 500 coupling the HP compressor 104 to the fuel cell 122 and/or an aircraft system. The engine bleed air system 500 includes one or more conduits 502, one or more engine bleed air ports 504, 506, and one or more engine bleed valves 508 regulating flow of the HP compressed air 108 from the HP compressor 104 through the conduits 502 to the fuel cell 122 and/or the aircraft system. FIG. 5A illustrates an example wherein the engine bleed ports comprise a first port 504 positioned aft of a second port 506, the second port 506 positioned to receive a lower pressure portion of the HP compressed air 108 and the first port 504 positioned to receive a higher pressure portion of the HP compressed air 108 (the higher pressure portion having a pressure higher than the lower pressure portion of the HP compressed air, e.g., because the higher pressure portion is outputted from a compressor stage (in the HP compressor) aft or downstream of the second port 506. The engine bleed air valves 508 include a first valve 508*a* controlling flow of the HP compressed air 108 into the engine bleed air system 500 from the first port 504 and a second valve 508*b* controlling flow of the HP compressed air 108 into the engine bleed air system 500 from the second port 506. In this way, the pressure of the HP compressed air 108 diverted to the engine bleed air system is regulated depending on a phase of flight. For example, during combustion mode operation (e.g., during take off), the first valve 508*a* closed and the second valve 508*b* is open to allow transfer of the lower pressure portion of the HP compressed air 108 into the engine bleed air system. In another example (e.g., during idle of the combustor or non-combustion mode), the first valve 508*a* is open and the second valve 508*b* are open to allow transfer of the higher pressure portion of the HP compressed air into the engine bleed air system 500.

Operation of the engine bleed air system 500 is illustrated in the following sections with reference to the fourth example. However, the engine bleed air system 500 is configurable to operate with any of the examples (e.g., first example, second example, and third example) described herein.

a. Operation when Combustor is Burning or Combusting Fuel (Combustion Mode)

Figure 5B:
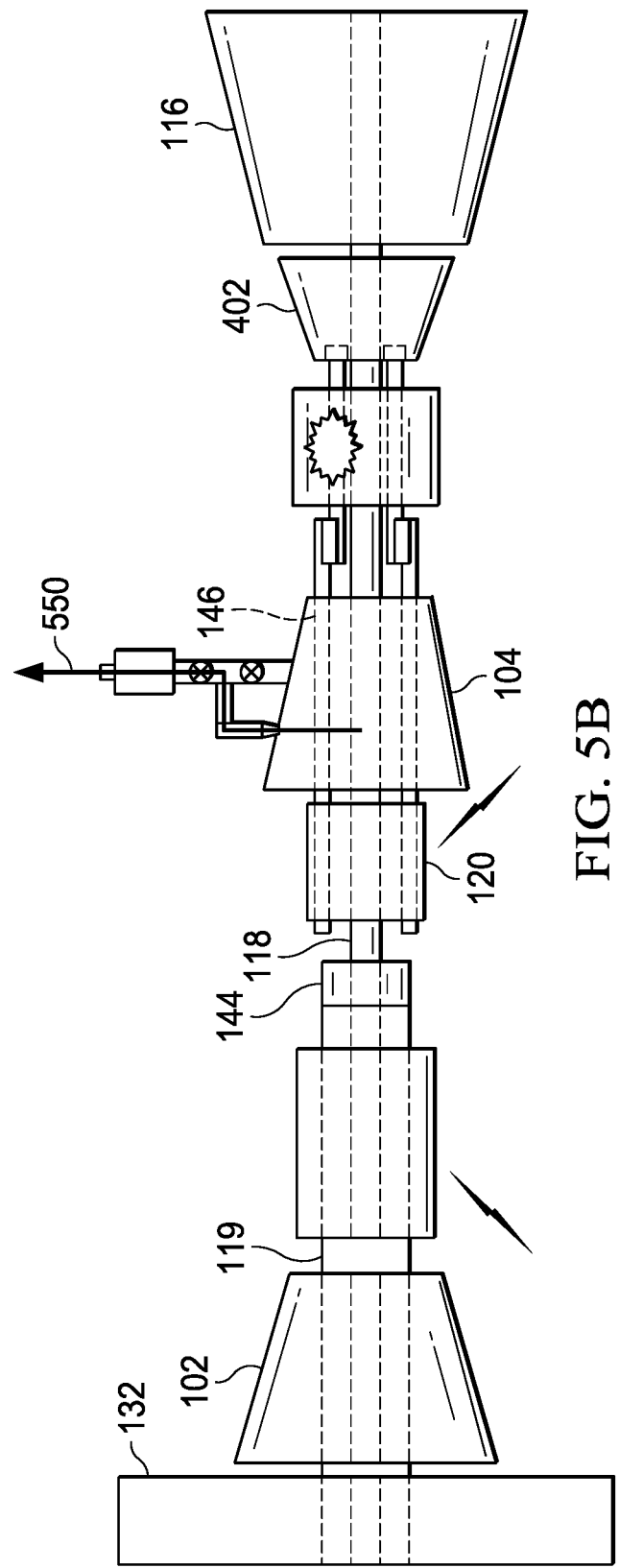
FIG. 5B illustrates an example configuration of the system of FIG. 5A during operation of the combustor (e.g., during take-off or climbing of the aircraft).

FIG. 5B illustrates operation of the fourth example when the combustor 110 is burning (or combusting) fuel 114 and outputting the first exhaust gas 112 driving the LP turbine 116 and the HP turbine 402. The LP clutch 144 couples or engages LP shaft 1 (119) to LP shaft 2 (118) so that LP turbine 116 is coupled to and drives the fan 132 and the LP compressor 102 via LP shaft 1 and LP shaft 2. The HP clutch 446 couples HP shaft 1 (146) to HP shaft 2 (444) so that the HP turbine 402 is coupled to and drives the HP compressor 104 via HP shaft 1 and HP shaft 2. The diverter 157 (e.g., nozzle 145*a*, 145*b*) is open to allow flow of the first exhaust gas 112 from the combustor 110, through the HP turbine 402 and the LP turbine 116, and out the first nozzle 147 to generate the core thrust 148. The engine bleed valve 508*b* is open to allow flow of the HP compressed air 108 through the engine bleed air system 500 to an aircraft system (e.g., the aircraft cabin via air conditioning or pressurizing system) and/or the fuel cell 122. The fuel cell 122 reacts the fuel 114 using the HP compressed air 108 received through the engine bleed air system 500 to generate electric power powering the LP motor 403 and/or the HP motor 120. In some examples, the LP motor 403 powered by the fuel cell 122 provides additional power for driving the fan 132 and the LP compressor 102 (in addition to the mechanical power supplied by the LP turbine 116). In yet further examples, the HP motor or electric machine 120 is driven by the HP turbine 402 via HP shaft 1 and HP shaft 2 and operates in generator mode to output electric power used to supply various aircraft systems.

b. Operation when Combustor is Deactivated (Non-Combustor Mode or Electric Mode)

FIG. 5C illustrates operation of the fourth example when the combustor 110 is switched off and not burning the fuel 114. The diverter 157 (e.g., variable nozzle 145*a*, 145*b* is closed) to block flow the HP compressed air 108 to one or more locations downstream of the HP compressor. The LP clutch 144 de-couples or dis-engages the LP shaft 1 from LP shaft 2 (de-coupling the LP compressor 102 from the LP turbine 116) and the HP clutch 446 de-couples or disengages the HP shaft 1 from HP shaft 2 (de-coupling the HP compressor 104 from the HP turbine 402). The HP motor 120, entirely powered using electric power from the fuel cell 122, drives (e.g., spins) the HP compressor 104 via HP shaft 1 (e.g., overrunning HP shaft 2). The LP motor 403, also entirely powered using electric power from the fuel cell 122, drives (e.g., spins) the fan 132 and the LP compressor 102 via LP shaft 1 (e.g., overrunning LP shaft 2).

FIGS. 5B and 5C further illustrate the output 418 of the engine bleed air system 500 outputting the engine bleed air 550 comprising a portion 516 of the second compressed air 108. In some examples, the output 418 is coupled to the fuel heat exchanger 154 and the fuel heat exchanger 154 transfers heat of the hotter portion 516 to boil the fuel 114 (e.g., liquid hydrogen outputted from the tank 150) into a gas suitable to be burned in the combustor 110 or reacted in the fuel cell 122. In another example, the output 418 is coupled to the low temperature heat exchanger 152 and the low temperature heat exchanger 152 uses colder fuel 114 to cool the portion 516 of second compressed air 108 to a lower temperature suitable for aircraft use (e.g., by an air conditioning system supplying air derived from the second compressed air 108 to the cabin).

6. Example Clutches

Figure 6A:
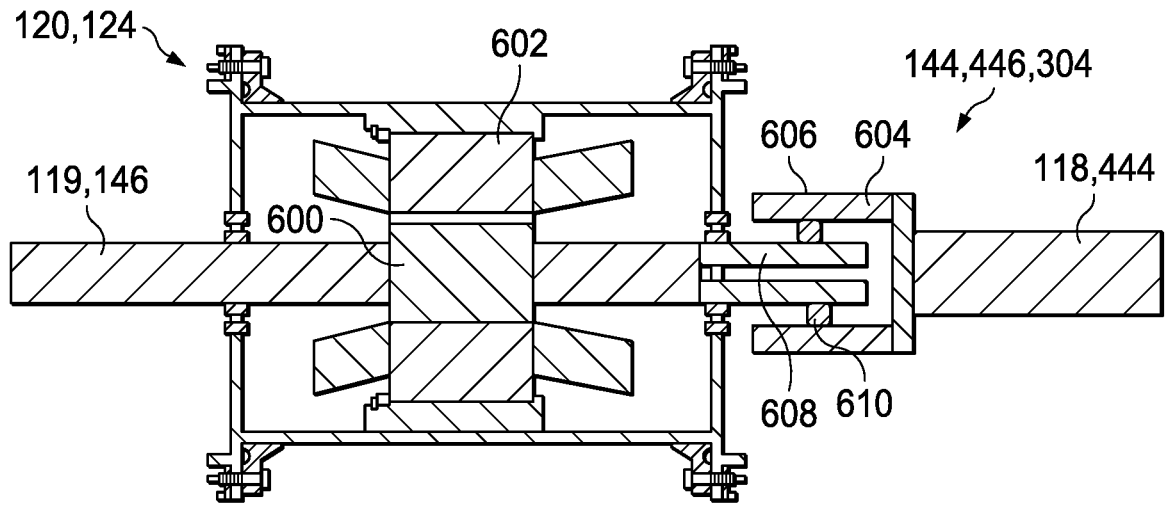
FIG. 6A is an enlarged view of an electric motor according to one or more examples described herein.

FIG. 6A shows an enlarged view of an electric machine (HP motor, LP motor, or LP moto-generator), a first drive shaft 119, 146 (HP shaft 1 or LP shaft 1), a second drive shaft 118, 444 (HP shaft 2 or LP shaft 2), and the clutch 144, 446, 304 (LP clutch, HP clutch, or LP-HP clutch). In the illustrated example, the electric machine 120, 124 includes an armature 600 coupled to the first drive shaft 119 and a stator 602 surrounding the armature 600. The armature 600 may be formed unitarily with the first drive shaft 119. The armature 600 may include coils and the stator 602 may include magnets (or electromagnets), or vice versa. When the electric motor 120, 124 is energized (e.g., via the controller 156), the armature 600 rotates, thereby rotating the first drive shaft 119, 146. When the electric motor 120, 124 is de-energized the armature 600 no longer functions as the primary driver of drive shaft 119. However, the armature 600 and therefore, the second drive shaft 119 are still free to rotate within the stator 602. In some examples, the LP electric motor 124 operates as a generator to power the HP motor 120 and/or provide electrical power directly to one or more electrical system(s) of the aircraft. The electric motor 120, 124 can be implemented as any type of electric motor (e.g., an induction motor, a DC/AC permanent magnet motor, etc.) and is not limited to the example electric motor 120, 124 shown in FIG. 6A. Instead, it is understood that other types of electric motors can be similarly used, and the armature, stator, commutator, etc. may be arranged differently depending on the type of motor.

Figure 6B:
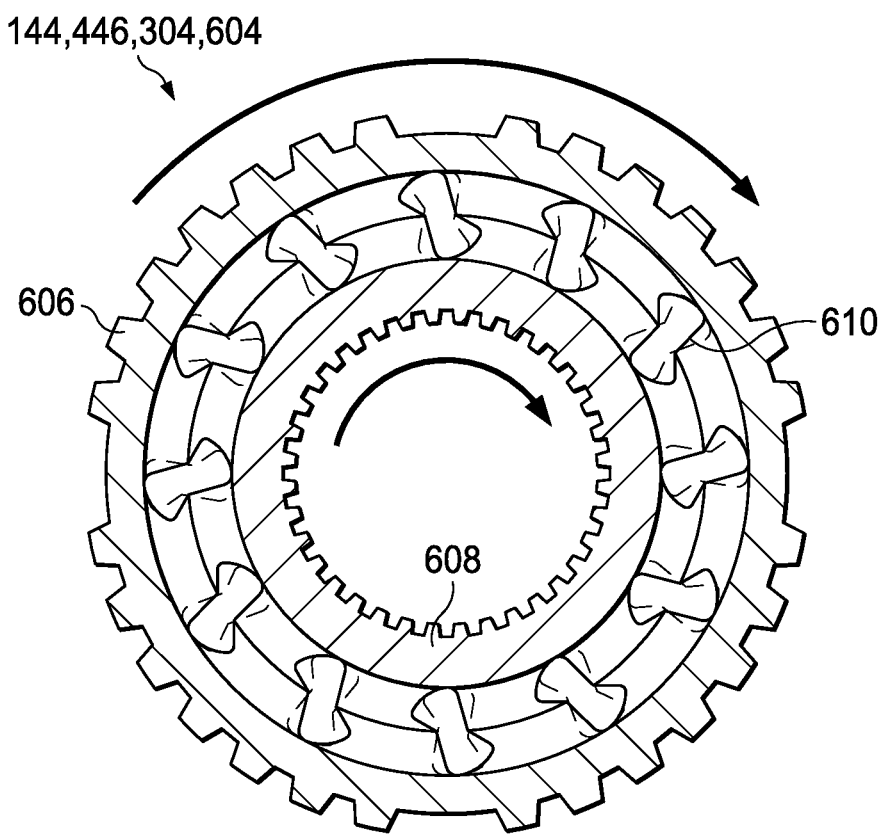
Figure 6C:
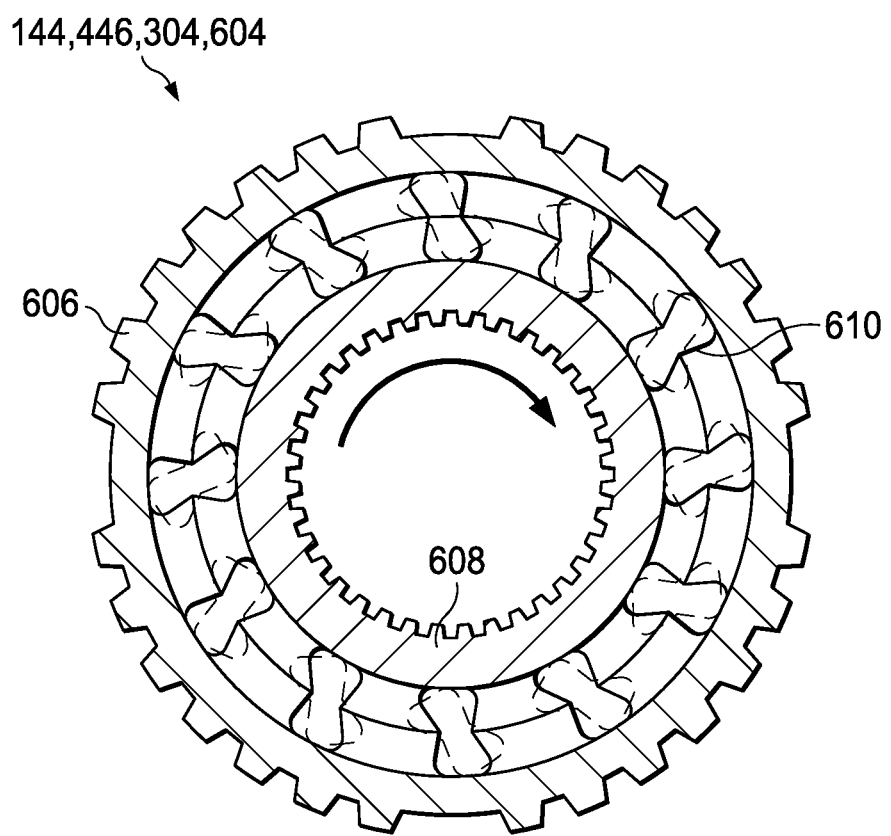

In the illustrated example, the overrunning clutch 144, 446, 304 is implemented as a sprag clutch 604. The sprag clutch 604 includes an outer race 606, an inner race 608, and a plurality of movable sprags 610 disposed between the outer race 606 and the inner race 608. In this example, the second drive shaft 118 (which is powered by the combustor 110 via a turbine (FIG. 1A)) is coupled to the outer race 606 and the first drive shaft 119 (which is coupled to the fan 132 (FIG. 4)) is coupled to the inner race 608. FIGS. 6A and 6B are cross-sectional views of the example overrunning clutch 144, 446, 304. The sprags 610 (one of which is referenced in each figure) are pivotable about their centers (extending into the page). In FIG. 6A, the outer race 606 is rotating in the clockwise direction. This occurs during the combustion mode of operation when the combustor 110 is and the first exhaust gas is driving the turbine 116. The interaction between the outer race 606 and the sprags 610 causes the sprags 610 to pivot into and engage the inner race 608. As a result, the outer race 606, the sprags 610, and the inner race 608 all rotate together, in the clockwise direction. Therefore, when the second drive shaft 118 rotates the outer race 606, the outer race 606 rotates the inner race 608 and, thus, rotates the first drive shaft 119 in the same direction. In FIG. 6B, the inner race 608 is rotating in the clockwise direction independent of the outer race 606. This occurs, for example, during the non-combustion (electric) operation when the combustor 110 is off and the electric motor 120, 124 is instead driving the first drive shaft 119. As shown in FIG. 6B, the inner race 608 slides along the inner surfaces of the sprags 610. However, this interaction does not cause the sprags 610 to frictionally engage the outer race 606. As such, the inner race 608 rotates in the clockwise direction without causing rotation of the outer race 606. If the outer race 606 is rotated up to match the rotational speed of the inner race 608, the sprags 610 are rotated into the inner race 608 and the outer race 606 eventually overdrives the inner race 608. As such, the inner race 608 rotates at least as fast as the outer race 606. Conversely, while the outer race 606 is rotating, the inner race 608 can be rotated independently at a faster rotational speed, which does not affect the outer race 606. The overrunning clutch 144 advantageously enables the combustor 110 and the electric motor 120 to independently drive the propulsor 100 without additional actuating components that are found in other types of clutches.

7. Example Diverters

Figure 7A:
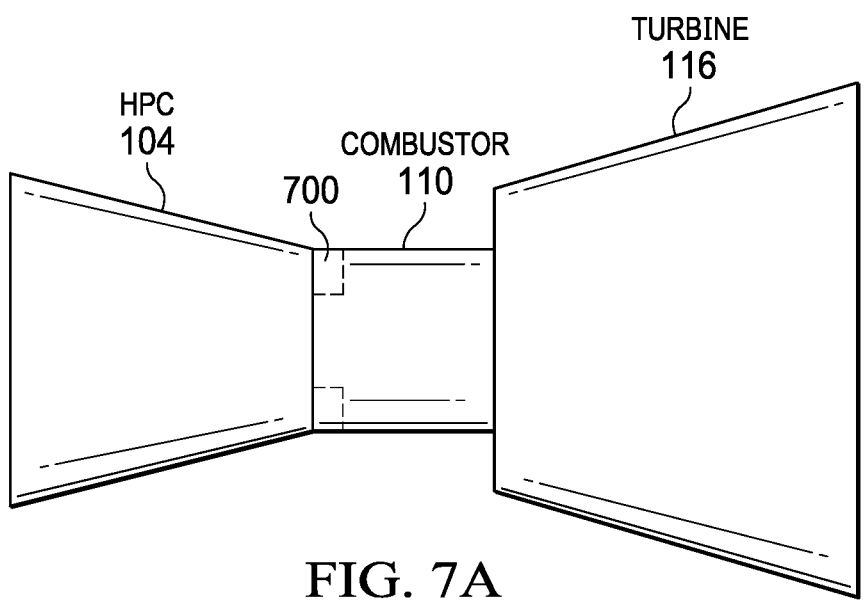
FIG. 7A illustrates positioning of a sleeve valve in a propulsor according to one or more examples described herein.
Figure 7B:
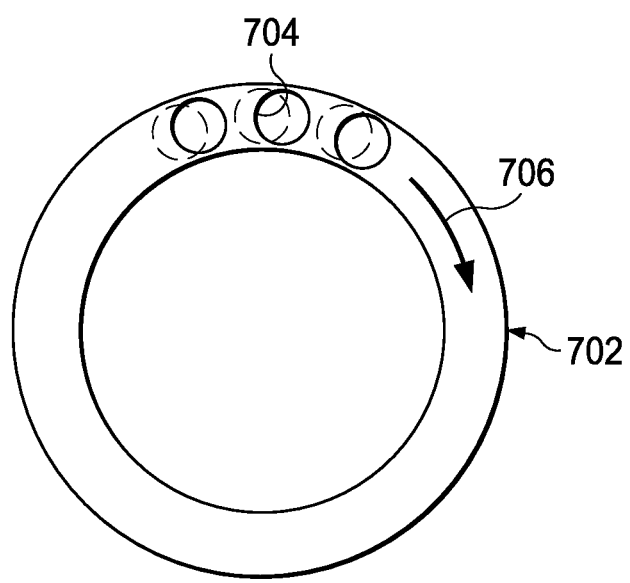
FIG. 7B illustrates an example sleeve valve.

FIGS. 7A and 7B illustrate an example diverter comprising an sleeve valve 700 comprising two adjacent plates 702 positioned (e.g., in a low Mach region of) the flow of the HP compressed air 108 or first exhaust gas in the propulsion system. The plates have holes 704:

(1) aligned (by rotation 706 of the plates 702 relative to one another) to allow flow of the first exhaust gas or the HP compressed air or the first exhaust gas through the holes during combustor mode operation of the propulsor 100, or (2) mis-aligned (by the rotation 706) to block flow of the first exhaust gas 112 or the HP compressed air through the holes during the non-combustor mode (electric mode) of operation of the propulsor 100. FIG. 7A illustrates and example wherein the sleeve valve 700 is connected to an output of the HP compressor 104 or to an input or inlet of the combustor 110.

Figure 8A:
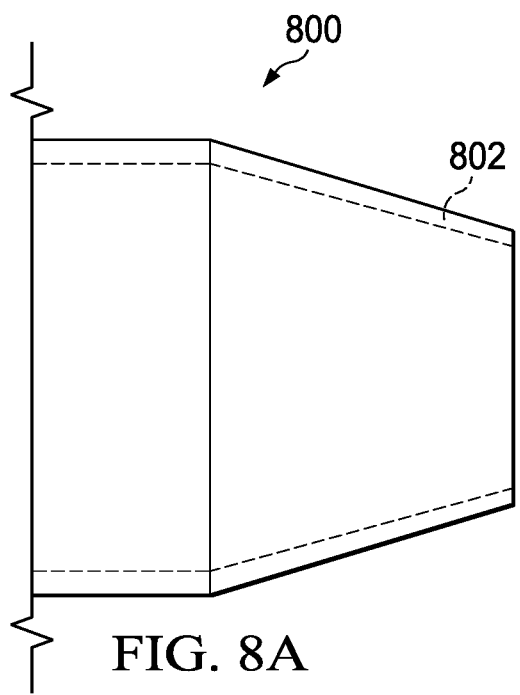
Figure 8B:
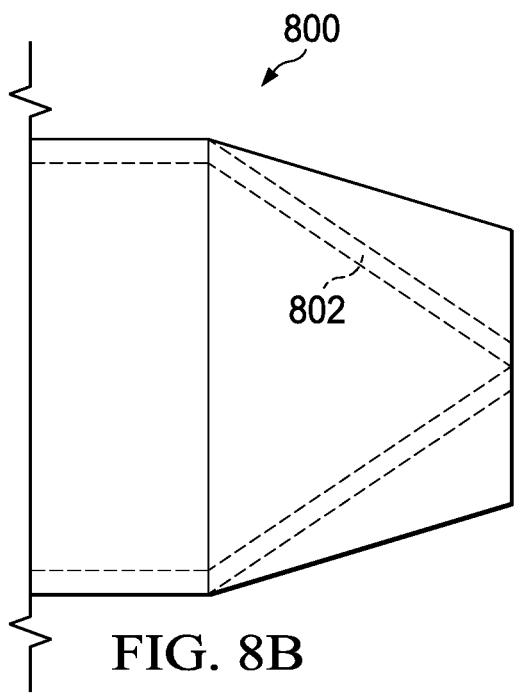

FIGS. 8A and 8B illustrate an example diverter 157 comprising a variable core nozzle 800 having adjustable nozzle walls 802. FIG. 8A illustrates the open configuration wherein the nozzle walls 802 are substantially parallel to the flow of the first exhaust gas 112 to allow substantially unobstructed flow of the first exhaust gas 112 outputted from the combustor 110 when the combustor is burning the fuel using the HP compressed air 108 in the combustor mode. FIG. 8B illustrates the closed configuration wherein the nozzle walls 802 are angled into the flow direction of the HP compressed air 108 to block flow of the HP compressed air 108 downstream of the HP compressor, enabling re-direction of the HP compressed air 108 for combustion with fuel 114 in the fuel cell 122 generating electrical power powering the LP compressor 102, the HP compressor 104, and the fan 132. In one or more examples, the variable core nozzle 800 is selected and configured to reduce aerodynamic drag.

Figure 8C:
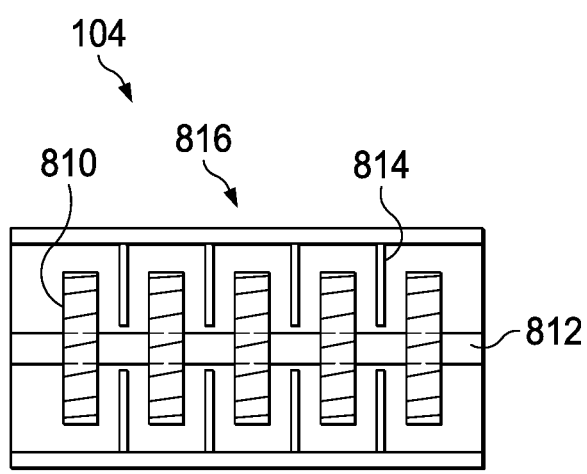
FIG. 8C illustrates an example HP compressor including rotor blades on rotor shaft and a diverter comprising adjustable vanes on a wall of the core.
Figure 9A:
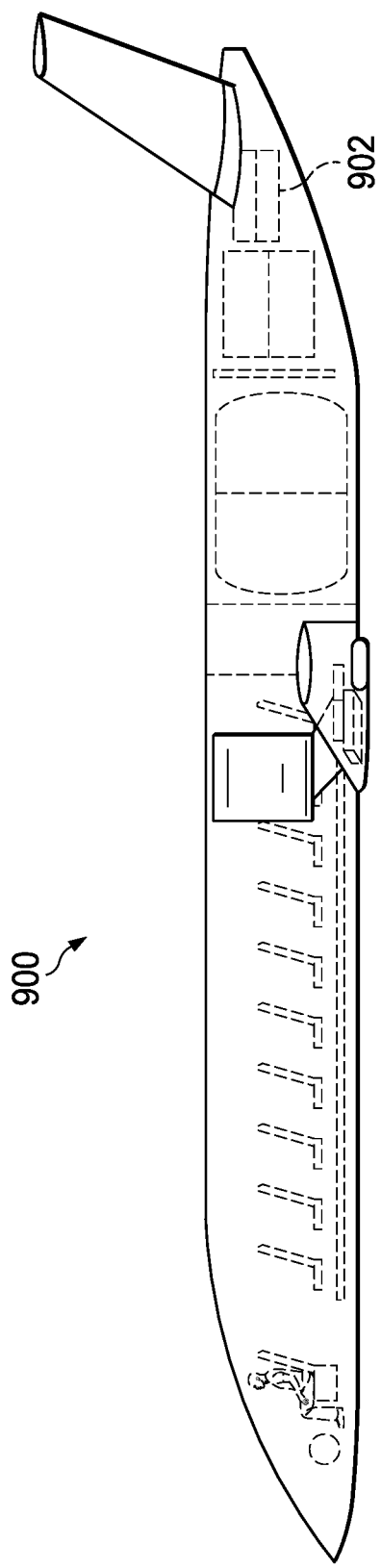
FIG. 9A-9D illustrate different views of an aircraft propelled using one or more propulsors according to examples described herein.
Figure 9B:
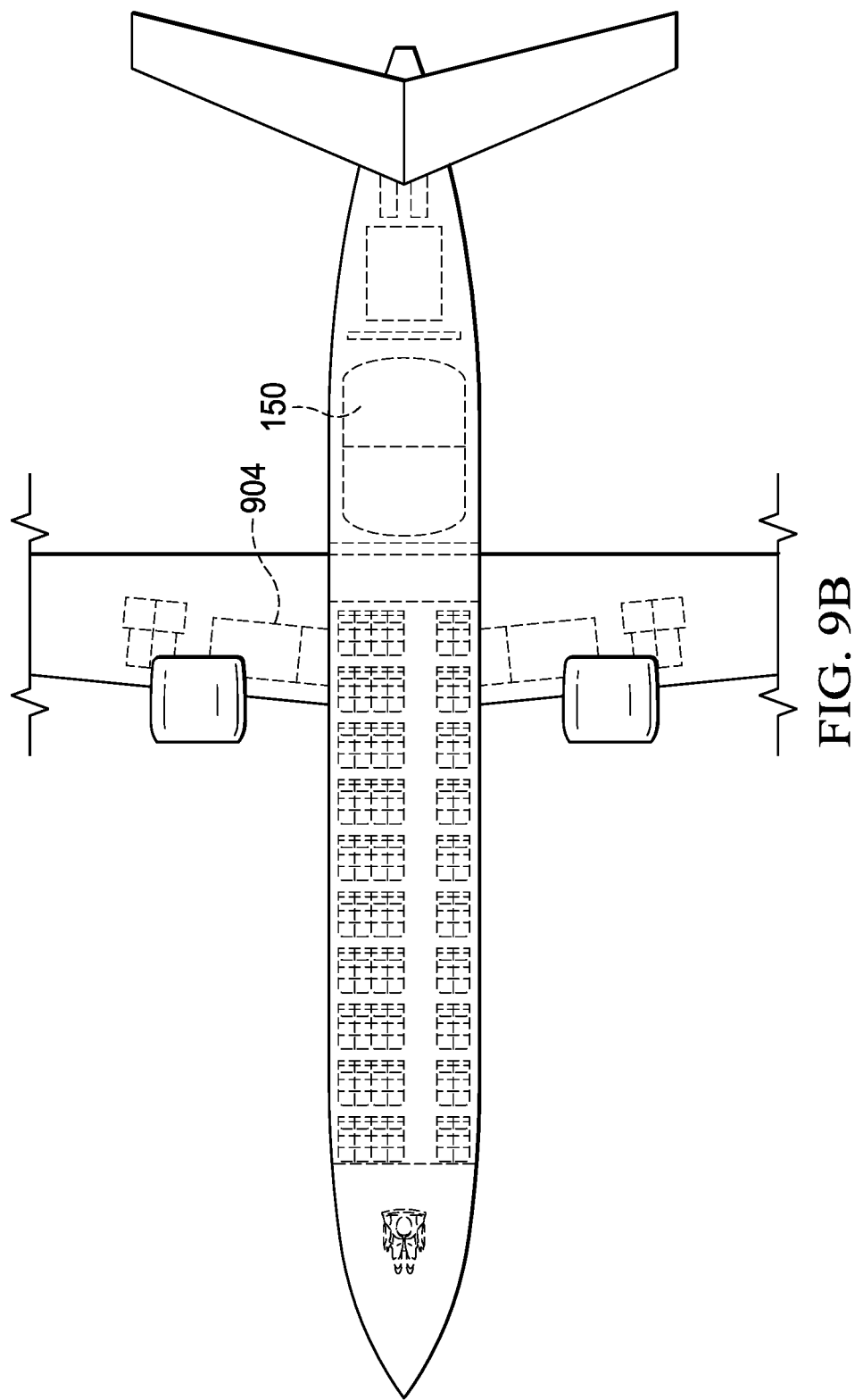
Figure 9C:
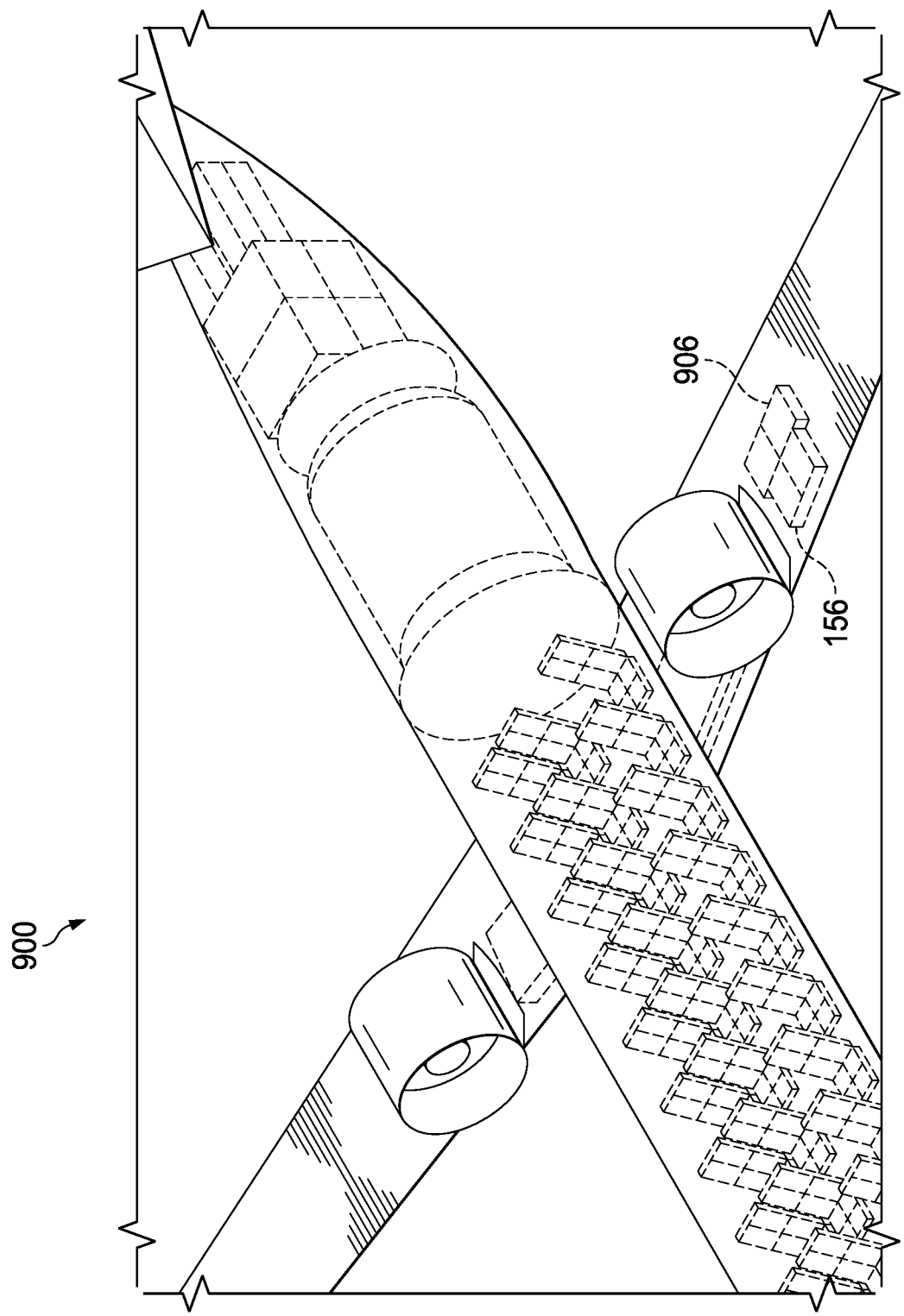
Figure 9D:
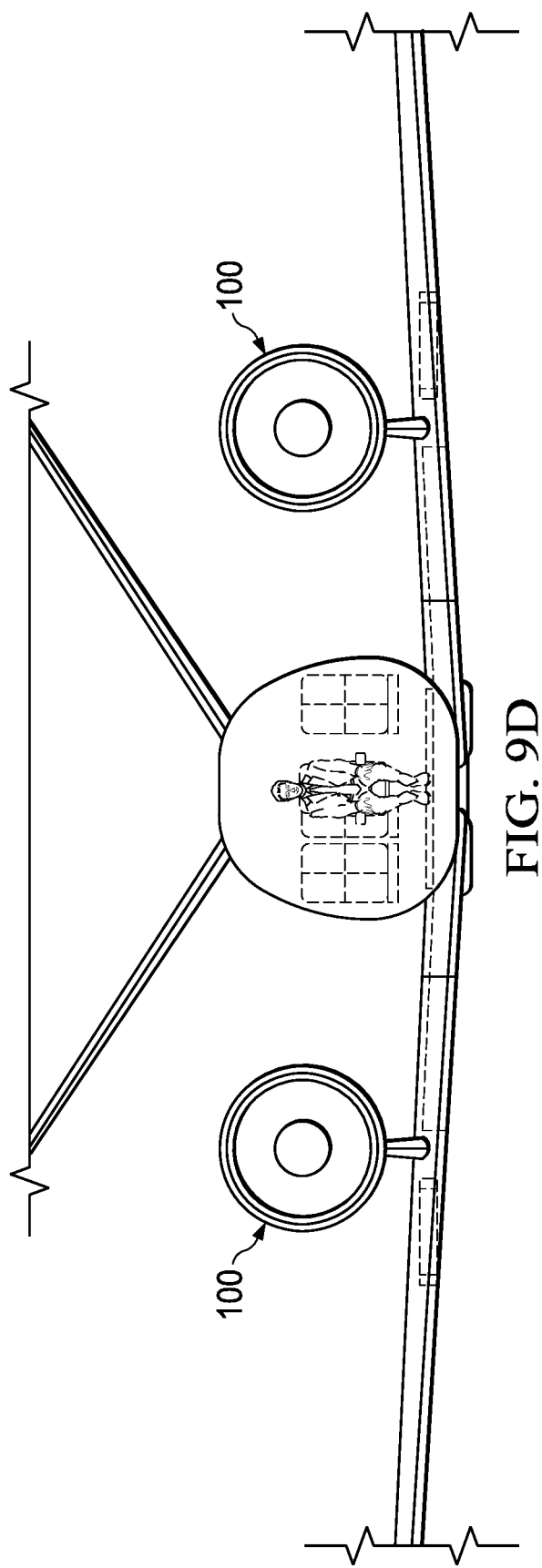
Figure 10:
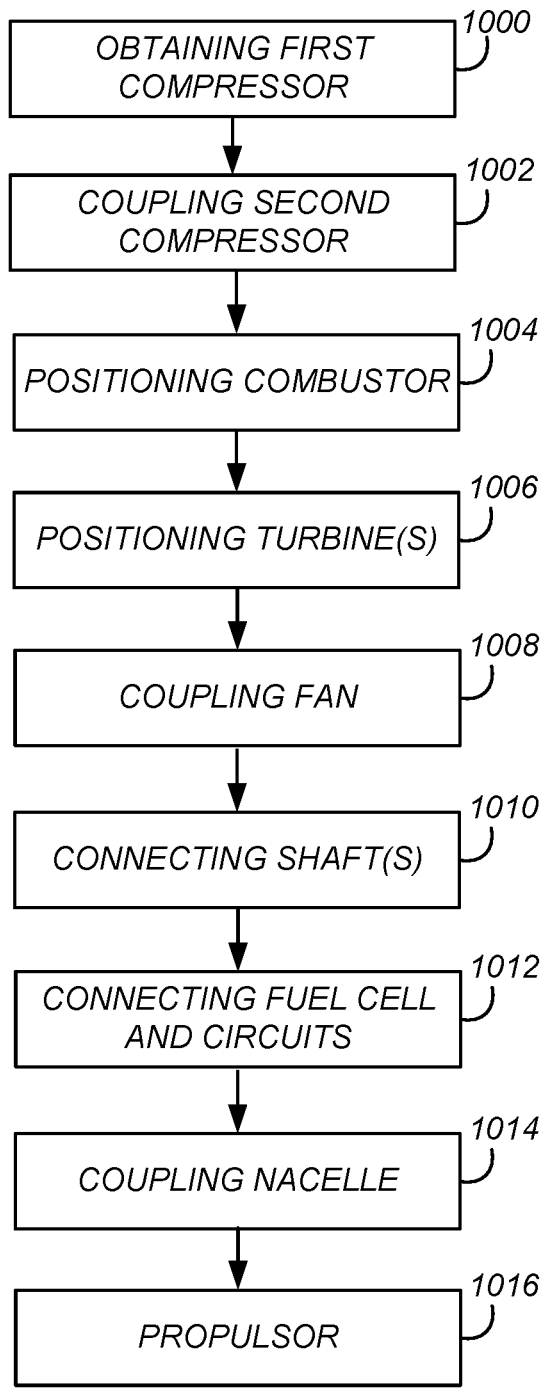
FIG. 10 is a flowchart illustrating a method of making a propulsor, according to one or more examples.

FIG. 8C illustrates an example HP compressor 104 including rotor blades 810 driven by a rotor shaft 812 (the rotor shaft 812 driven by HP motor 120) and a diverter 157 comprising adjustable vanes 814 on a wall 816 of the core. In this example, the adjustable vanes (e.g., de-swirl vanes) are movable (1) to allow flow of the HP compressed air 108 downstream of the vanes 814 when the vanes are in an open position during operation of the propulsor in the combustion mode, or (2) into the flow so as to block flow of the HP compressed air downstream of the engine bleed air system 500 when the vanes are in a closed position during operation of the propulsor in the non-combustion mode or electric mode.

8. Example Compressor and Electrical Machine Configurations

In various examples, the HP motor driven by the fuel cell enables various modifications of the configuration of, or the size and number of various components in, the propulsor 100.

In one or more examples, the LP electric machine drives the LP compressor and/or the HP motor drives the HP compressor to output the HP compressed air having a pressure tailored for optimal functioning of the fuel cell and other aircraft systems (other than the propulsor or the combustor 110). In one or more examples, the air pressure required for combustion in the fuel cell or the aircraft system is lower (e.g., 45 psi) as compared to the capability of the LP compressor and HP compressor and the air pressure needs for combustion in the combustor (e.g., ~160 psi). However, since the LP compressor and the HP compressor are decoupled from the turbines during non-combustion mode operation, the electric machines can spin the compressors at the optimum or tailored speed for fuel cell air production or other air pressure needs of various aircraft systems.

In various examples, the compressors and turbine(s) each include one or more compression stages or turbine stages that are sized for different engine configurations including the HP motor. For example, the presence of the HP motor driving the HP compressor allows reduction of the number of, the size of, and the number of compression stages in the compressor and/or the number of turbine stages in the turbine(s) because at least some of the power for driving the HP compressor is derived from the fuel cell instead of the turbines. In some examples, at least one of the number of turbines, the size of the turbine, and the number of turbine stages in the turbine are selected to be sufficient to power the fan, LP compressor, and provide the electrical power to one or more aircraft systems (including the HP motor), but not the HP compressor.

In yet further examples, at least one of the size (or number of blades) in the fan, the number of compressor stages in each of the HP compressor and the LP compressor, or the bypass ratio (the amount of air drawn into the duct as compared to into the core) are tailored so that the fan producing the second exhaust gas provides all the thrust during cruise of the aircraft.

In one or more examples, the HP motor drives the HP compressor at higher velocities (i.e., the HP compressor blades on the HP rotor shaft in the HP compressor are driven at higher angular velocity) as compared to the HP compressor driven by an HP turbine. In other examples, the turbine is configured to spin LP shaft 1 and LP shaft 2 at higher velocities tailored for increased efficiency performance of the LP compressor (independent of the velocity requirements of the HP compressor) since the HP compressor is driven separately by the HP motor. In yet further examples, the one or more circuits control the transfer of electrical power so that the HP motor drives the HP compressor at different speeds than the LP compressor, the speed of the HP compressor specifically tailored for different phases of the flight (take off, cruise, high altitude cruise, descent etc.).

In yet further examples, powering the HP motor using a fuel cell reduces the required size of the HP motor (i.e., reduces the number of windings or coils) as compared to the HP motor driven entirely by a generator (because in some examples, generators operate at higher voltages than the fuel cell). In other examples, the LP electrical machine is configured (e.g., sized, including the number of windings in the generator and motor) to output the electrical power requirements of the HP compressor and LP compressor and fan during the various phases of operation of the aircraft.

9. Example Aircraft Including the Propulsion Systems

FIG. 9A-9D illustrate an aircraft 900 coupled to a propulsion system 100, 200, 300, 400, including fuel cell 122 (e.g., comprising a fuel cell stack 904) and motor controller 156, liquid hydrogen tank 150, and aircraft systems (e.g., thermal management system 902 and power conditioner 906).

10. Example Process Steps

Method of Making

Block 1000 represents providing a first compressor (e.g., LPC).

Block 1002 represents coupling a second compressor (e.g., HPC) to the first compressor so as to receive a first compressed air outputted from the first compressor the second compressor compressing the first compressed air to form a second compressed air.

Block 1004 represents positioning a combustor downstream of the second compressor to receive the second compressed air outputted from the second compressor, the combustor outputting a first exhaust gas formed from a fuel burned with the second compressed air.

Block 1006 represents positioning a least one turbine downstream of the combustor to receive the first exhaust gas.

Block 1008 represents coupling a fan to the first compressor to draw:

a first portion of air into the duct to generate a second exhaust outputted from the duct, the second exhaust providing a thrust to an aircraft propelled using the aircraft propulsion system, and a second portion of the air into the first compressor, wherein the first compressor compresses the second portion of the air to form the first compressed air inputted to the second compressor.

Block 1010 represents connecting one or more electric machines driving the compressor(s) (to form the compressed air) and the fan, and connecting a fuel cell and one or more electric circuits and controllers to the electric machines for powering the electric machines. The one or more circuits and controllers control flow of the electric power between the fuel cell and the electric machines.

In one or more examples, the step comprises selecting a size, weight and power rating of the fuel cell for use during cruise (not as the main power supply during take-off), so that the fuel cell is smaller, lighter, and has smaller power output than a fuel cell sized for providing all the power to the propulsor during take-off. In one or more examples, high power demand is met by burning fuel in the combustor.

Block 1012 represents connecting one or more shafts coupling the turbine to the first compressor and the fan, coupling an electric machine to the second compressor, and optionally coupling an electric machine to the fan and the first compressor.

Block 1014 represents providing a nacelle and a duct between a core and the nacelle, the core comprising the second compressor, the combustor, and the turbine, and the nacelle housing the core and the fan.

Block 1016 represents the end result, a propulsor for an aircraft or drone. Illustrative, non-exclusive examples of inventive subject matter according to the present disclosure are described in the following enumerated paragraphs:

A1. An aircraft propulsion system (100, 200, 300, 400) comprising:

a first compressor (102) (e.g., LP compressor (102));

a second compressor (104) (e.g., HP compressor (104)) coupled to the first compressor (102) to receive a first compressed air (106) outputted from the first compressor (102) and compress the first compressed air (106) into a second compressed air (108);

a combustor (110) positioned downstream of the second compressor (104) to receive the second compressed air (108) outputted from the second compressor (104), the combustor (110) outputting a first exhaust gas (112) formed from a fuel (114) burned with the second compressed air (108);

a turbine (116) positioned downstream of the combustor (110) to receive the first exhaust gas (112);

a shaft (118) connected or coupled to the turbine (116) and the first compressor (102), the shaft (118) transferring power (e.g. mechanical power) from the turbine (116), driven by the first exhaust gas (112), to the first compressor (102) forming the first compressed air (106);

an HP electric motor (120) connected to or coupled to the second compressor (104);

a fuel cell (112) connected to (e.g., electrically coupled to) the HP electric motor (120), the fuel cell (122) configured to react the second compressed air (108) with the fuel (114) to generate HP electric power used to power the HP electric motor driving the second compressor (104) to form the second compressed air (108).

A2. The aircraft propulsion system (100, 200, 300, 400) of paragraph A1, further comprising:

a generator (124) connected or coupled to the first shaft to generate electric power from the power transferred from the turbine (116); and a circuit (126) transmitting the electric power from the generator (124) to the HP electric motor (120) to power the HP electric motor (120) driving the second compressor (104).

A3. The aircraft propulsion system (1200) (100, 200, 300, 400) of any of the paragraphs A1-A2, further comprising:

a nacelle (128);

a duct (130) between a core and the nacelle (128), the core comprising the second compressor (104), the combustor (110), and the turbine (116);

a fan (132) (e.g., main engine fan) coupled to the first compressor (102) and the duct (130) to draw:

a first portion (134) of air (136) into the duct (130) to generate a second exhaust (138) outputted from the duct (130), the second exhaust (138) providing a thrust (140) (e.g., fan thrust) for an aircraft (900) propelled using the aircraft propulsion system (100, 200, 300, 400), and a second portion (142) of the air (136) into the first compressor (102), wherein the first compressor (102) compresses the second portion (142) of the air (136) to form the first compressed air (106) inputted to the second compressor (104).

A4. The aircraft propulsion system (100, 200, 300, 400) of any of the paragraphs A1-A3, further comprising:

an LP electric motor (124);

a first LP shaft (119) connected to the fan (132) and the first compressor (102);

the shaft (118) comprising a second LP shaft (118);

an LP clutch (144) connected to the second LP shaft (118) and the first LP shaft (119); and a first configuration comprising the combustor burning the fuel to form the first exhaust gas 112 and the LP clutch (144) connecting the first LP shaft (119) to the second LP shaft (118) so that the first LP shaft (119) and the second LP shaft (118) transfer the power from the turbine (116), driven by the first exhaust gas (112), to the first compressor (102) and the fan (132); and a second configuration comprising the fuel cell reacting the fuel (114), the LP clutch disengaging the first LP shaft (119) from the second LP shaft (118), and the LP electric motor (124) driving the fan (132) and the first compressor (102) via the first LP shaft (119).

A5. The aircraft propulsion system (100, 200, 300, 400) of paragraph A4, further comprising:

one or more circuits (126); and a computer (1202) system (1200) instructing:

activation of the second configuration during a cruise of the aircraft, the second configuration further comprising the one or more circuits (126) electrically connecting the LP electric motor (124) to the fuel cell (122) and the fuel cell (122) powering the LP electric motor (124) via the one or more circuits (126), and activation of the first configuration during a take-off of the aircraft.

A6. The aircraft propulsion system (100, 200, 300, 400) of any of the paragraphs A1-A6, further comprising:

an LP-HP clutch (446):

connecting the second compressor (104) to the shaft (118) during a take-off of an aircraft (900) propelled using the aircraft propulsion system (100, 200, 300, 400), wherein the turbine (116) drives the second compressor (104) via the shaft (118); and dis-engaging the shaft (118) from the second compressor (104) during a cruise of the aircraft (900).

A7. The aircraft propulsion system (100, 200, 300, 400) of paragraph A6, further comprising a gearing connected to the second compressor (104) to adjust a torque output of the turbine (116) transferred to the second compressor (104).

A8. The aircraft propulsion system (100, 200, 300, 400) of any of the paragraphs A1-A8, further comprising: one or more clutches (144):

dis-engaging at least one of the fan (132), the first compressor (102), or the second compressor (104) from the shaft (118) in a first configuration, the first configuration further comprising:

the fuel (114) cell reacting the fuel (114) with the second compressed air (108) to generate electric power powering the electric motor (120) driving the second compressor (104), and the combustor (110) not outputting an amount of first exhaust gas sufficient to generate thrust propelling an aircraft coupled to the aircraft propulsion system;

coupling at least one of the fan (132), the first compressor (102), or the second compressor (104) to the shaft (118) in a second configuration further comprising:

the combustor (110) burning the fuel (114) with the second compressed air (108) to generate the first exhaust gas (114) driving the turbine (116) and the turbine (116) driving the second compressor (104) via the shaft (118).

A9. The aircraft propulsion system (100, 200, 300, 400) of paragraph A8, wherein each of the clutches (144, 304, 446) comprise a sprag clutch.

A10. The aircraft propulsion system (100, 200, 300, 400) of any of the paragraphs A1-A9, further comprising:

a diverter (157) regulating flow of the second compressed air (108) outputted from the second compressor (104) into the combustor (110) or the fuel (114) cell.

A11. The aircraft propulsion system (100, 200, 300, 400) of paragraph A10, wherein:

the diverter (157) comprises a valve (700) connected to at least one of the second compressor (104) or the combustor (110), the valve (700) is open in the first configuration allowing output of the second compressed air (108) to the combustor (110), and the valve (700) is closed in the second configuration blocking flow of the second compressed air (108) to the combustor (110).

A12. The aircraft propulsion system (100, 200, 300, 400) of paragraph A11, wherein the valve (700) comprises a sleeve valve (700) or a combustor inlet valve (700).

A13. The aircraft propulsion system (100, 200, 300, 400) of paragraph A10, further comprising a nozzle (147) directing the first exhaust gas (112) to produce a thrust (148) propelling the aircraft (900), wherein:

the nozzle (147) includes a variable core nozzle (145a, 145b), the diverter (157) comprises the variable core nozzle (145a) or a variable turbine nozzle (145b), the diverter is open in the first configuration to allow flow of the first exhaust gas (112) out of the nozzle (147) to produce the thrust (140), and the diverter (157) is closed in the second configuration to divert the flow of the second compressed air (108) to the fuel cell (114).

A14. The aircraft propulsion system (100, 200, 300, 400) of any of the paragraphs A10-1A12, wherein the diverter (157) is positioned:

in the second compressor (104), or downstream of the second compressor (104) and upstream of the combustor (110).

A15. The aircraft propulsion system (100, 200, 300, 400) of any of the paragraphs A10 or A14, wherein the diverter (157) comprises an adjustable vane (814) in, or coupled to, the second compressor (104), the adjustable vane (814):

in the second configuration, diverting flow of the second compressed air (108) to the fuel (114) cell and blocking flow of the second compressed air (108) downstream to the combustor (110), and in the first configuration, allowing flow of the second compressed air (108) downstream to the combustor (110).

A16. The aircraft propulsion system (100, 200, 300, 400) of paragraph A8, further comprising:

an engine bleed air system (500) coupled to the second compressor (104);

the second configuration further comprising the engine bleed air system (500) conveying the second compressed air (108) from the second compressor (104) to the fuel cell (122), or an aircraft system (902) coupled to the engine bleed air system (500) and the engine bleed air system (500) conveying a first portion of the second compressed air (108) to the fuel cell (122) and a second portion of the second compressed air (108) to the aircraft system (902) for pressurizing a cabin in the aircraft (900).

A17. The aircraft propulsion system (100, 200, 300, 400) of any of the paragraphs A8-A16, further comprising:

a nacelle (128);

a fan (132) coupled to a core comprising the second compressor (104), the combustor (110), the turbine (116), and an HP turbine (116) downstream of the combustor (110);

a duct (130) between the core and the nacelle (128);

an LP electric motor (124) connected to the fuel cell (122);

a plurality of shafts including a first LP shaft (119), the shaft (118) comprising a second LP shaft (118), a first HP shaft (146), and a second HP shaft (444);

the clutches (144) including an LP clutch (144) and an HP clutch (446);

the first configuration further comprising:

the LP clutch (144) coupling the first LP shaft (119) and the second LP shaft (118), the LP turbine (116), driven by the first exhaust gas (112), driving the first compressor (102) and the fan (132) via the first LP shaft (119) and the second LP shaft (118), the HP clutch (446) coupling the first HP shaft (146) and the second HP shaft (444), and the HP turbine (402), driven by the first exhaust gas (112) in the first configuration, driving the second compressor (104) via the first HP shaft (146) and the second HP shaft (444); and the second configuration further comprising:

the LP clutch (144) dis-engaging the first LP shaft (119) and the second LP shaft (118) and the fuel cell (122) powering the LP electric motor (124) to drive the fan (132) so that the fan (132) draws:

a first portion (134) of air (136) into the duct (130) to generate a second exhaust (138) outputted from the duct (130), the second exhaust (138) providing thrust (140) to an aircraft (900) propelled using the aircraft propulsion system (100, 200, 300, 400), and a second portion (142) of the air (136) into the first compressor (102) so as to form the first compressed air (106), the HP clutch (446) disengaging the first HP shaft (146) from the second HP shaft (444), and the fuel cell (124) powering the HP motor (120) to drive the second compressor (104) via the first HP shaft (146).

A18. The aircraft propulsion system (100, 200, 300, 400) of any of the paragraphs A8-A17, further comprising:

a computer (1202) instructing:

activation of the first configuration during at least one of a take-off or climb of the aircraft; and activation of the second configuration during at least one of a cruise, taxiing, descent, or landing of the aircraft.

A19. The propulsion system (100, 200, 300, 400) of any of the paragraphs A17-A18, wherein:

the fan (132) comprises a plurality of first blades and the second compressor (104) comprises a plurality of second blades, a computer (1202) controls a first angular velocity of the plurality of first blades to generate the second exhaust (138) needed for thrust (140) during cruise of the aircraft (900), and the computer (1202) controls a second angular velocity of the second blades so as to provide sufficient flow and pressure of the second compressed air (108) to the fuel cell (124) needed to generate electric power consumed by the HP electric motor (120) and LP electric motor (124) during the cruise of the aircraft (900) powered using the second exhaust (138).

A20. The aircraft propulsion system (100, 200, 300, 400) of paragraph A19, wherein the second compressor (104) has a number of compression stages tailored for providing the sufficient flow.

A21. The aircraft propulsion system (100, 200, 300, 400) of any of the paragraphs A17-A20, further comprising a gearing connected to the first LP shaft (119) between the first compressor (102) and the fan (132), the gearing adjusting a torque output of the LP electric motor (124) for driving the fan (132) at a different speed than the first compressor (102).

A22. The aircraft propulsion system (1200) (100, 200, 300, 400) of any of the paragraphs A1-A21, wherein the second compressor (104) comprises at least one of a high pressure compressor or an intermediate pressure compressor, and the first compressor (102) comprises a low pressure compressor.

A23. An aircraft (900) comprising the aircraft propulsion system (1200) (100, 200, 300, 400) of any of the paragraphs A1-A22, further comprising a fuel tank (150) connected to the combustor (110) and the fuel cell (122), wherein the aircraft propulsion system (100, 200, 300, 400) is configured to generate thrust (140) solely by reacting the fuel (114) with the second compressed air (108) in at least one of the combustor (110) or the fuel cell.

A24. The aircraft (900) of paragraph A23, wherein the fuel (114) comprises hydrogen.

A25. An aircraft propulsion system comprising:

a hydrogen powered gas turbine engine;

a fuel cell;

an electric motor electrically coupled to the fuel cell and mechanically coupled to a fan, and a controller coupled to the gas turbine engine, the fuel cell, and the motor, the controller configured to supply hydrogen directly to the gas turbine engine in a first mode of operation and supply hydrogen to the fuel cell in a second mode of operation.

A26. The system of paragraph A25 wherein the fuel cell is configured to supply electrical power to the motor during the second mode of operation.

A27. The system of paragraph A25 further comprising sprag clutch coupled to the motor.

A28. The system of paragraph A25 further comprising dampers to prevent airflow through a portion of the gas turbine engine during the second mode of operation.

A29. An aircraft comprising:

at least one hydrogen fuel tank; and the propulsion system of any of the paragraphs A25-29, wherein the propulsion system is configured to be powered solely by the hydrogen.

A30. The propulsion system of paragraph A1, wherein the second compressor is only driven by an electric motor and the propulsion system does not include an HP clutch or an HP turbine.

A31. The propulsion system of paragraph A1, comprising a clutch and gearing comprising a gear ratio between the LP turbine and an HP shaft driving the HP compressor.

A32. The propulsion system of any of the paragraphs A1-A31, wherein fan Thrust (140) is generated by the main engine fan 132, core Thrust (148) is generated by the gas turbine exhaust during combustion only, and supplemental thrust (159) comprises thrust recovery from the fuel cell exhaust.

A33. The aircraft propulsion system of any of the paragraphs A1-A32, further comprising the engine bleed air system (500):

coupled to at least one of the second compressor (104) or the first compressor (102) so as to obtain engine bleed air (550) comprising at least a portion (516) of the second compressed air (108) or the first compressed air (106), coupled to at least one of:

a low temperature heat exchanger (152) configured to cool at least a portion of the engine bleed air (550) to one or more temperatures suitable for aircraft use on the aircraft (e.g., in an air conditioning system); or a fuel heat exchanger (154) configured to transfer heat from the engine bleed air (550) to the fuel (114) comprising liquid hydrogen, so that the heat boils the liquid hydrogen into a gas suitable for burning in the combustor (110) or reaction in the fuel cell (122) to generate the HP electric power.

A34. The aircraft propulsion system (100) of any of the paragraphs A1-A5, wherein:

the turbine (116) comprises the single or only turbine in the aircraft propulsion system (100) and the propulsion system does not include an additional HP turbine for driving the second compressor (104) and/or the turbine (116) is not sized or configured to mechanically drive the second compressor (104) directly via an HP shaft.

Method of Operating

Figure 11:
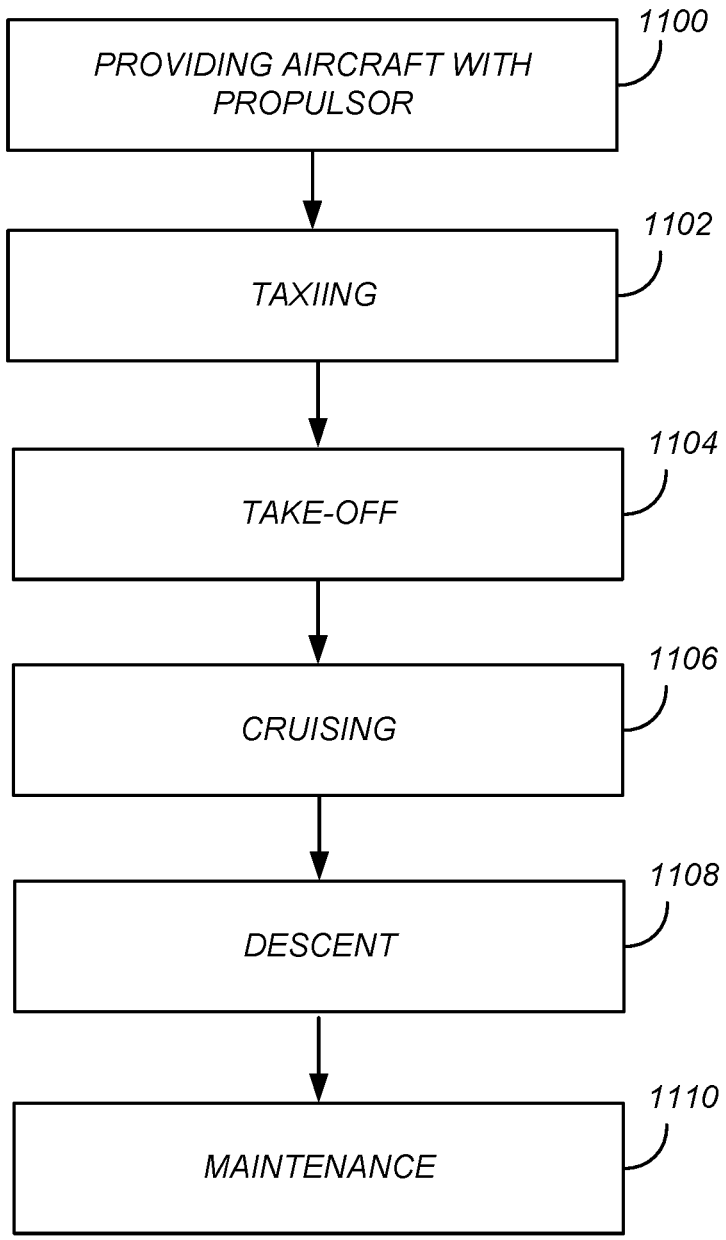
FIG. 11 is a flowchart illustrating a method of operating a propulsor, according to one or more examples.

FIG. 11 illustrates a method of generating thrust.

Block 1100 represents obtaining or providing a propulsor comprising a hybrid gas turbine engine, e.g., as described in any of the paragraphs A1-A Block 1102 represents taxiing the aircraft. In one or more examples, the propulsor (e.g., including at least one of the fan, LPC, and HPC) is powered entirely by the fuel cell reacting a fuel (e.g., hydrogen) using the compressed air outputted from a compressor in the hybrid gas turbine engine.

Block 1104 represents take-off and/or climbing the aircraft. The propulsor is at least partially powered by the combustion of the fuel in the combustor with compressed air to generate a first exhaust gas providing a core thrust for an aircraft. In one example, the engine burns the fuel comprising hydrogen (or other fuel not including kerosene or a hydrocarbon fossil fuel) by channeling the hydrogen directly to into the combustor of the core gas turbine engine. In one or more examples, the combustor is coupled to a turbine and the turbine is coupled to a generator so that exhaust gas driving the turbine is used to generate electric power useful for driving the one or more compressors outputting the compressed air. In one or more examples, the fuel cell is used to provide supplementary power to the one or more compressors providing compressed air to the combustor.

Block 1106 represents cruising of the aircraft, wherein the propulsor is powered by reacting of the fuel in the fuel cell so as to generate electricity used to power at least one of the compressors and a fan generating the second exhaust comprising a second thrust during the cruise of the aircraft. In one or more examples, the compressor(s) and fan are powered entirely by the fuel cell.

Block 1108 represents descent and/or landing of the aircraft. In one or more examples, the propulsor is powered by reacting of the fuel in the fuel cell so as to generate electricity used to power at least one of the compressors and a fan generating the second exhaust comprising a second thrust during the descent and/or landing of the aircraft.

Block 1110 represents optional maintenance of the aircraft. In one or more examples, the step comprises adjusting (e.g., reducing) a frequency of maintenance of the turbines in the gas turbine engine depending on the number of hours the turbines are operated (e.g., taking into account that the turbines are only used for a portion of the aircraft mission during periods of peak demand (e.g., take-off), thereby reducing wear and tear of the turbines.

Example variations of the method include, but are not limited to, one or any combination of the following.

B1. The method wherein one or more electric motors are coupled to at least one of the fan or one or more compressors (booster/LPC and/or HPC) via one or more clutches and the fuel cell generates the electrical power to drive the electric motor(s) powering the at least one of the fan or the one or more compressors.

B2. The method wherein one or more diverters (e.g., dampers, valves) bypass the compressed air outputted from the HPC away from the combustor to the fuel cell during operation of the fuel cell. In one or more examples, HP turbine and LP turbine are shut down using a variable turbine inlet nozzle during operation of the fuel cell.

B3. The method comprising selecting the fuel cell to power the hybrid gas turbine engine during one or more phases of flight (taxiing, take-off, climbing, cruising at various altitudes, and descent) to control the thrust specific fuel consumption and utilize the fuel more efficiently (taking into account that fuel cell energy conversion efficiency is higher than gas turbine fuel energy conversion). In one or more examples, the propulsor is entirely powered by the fuel cell during at least one of taxiing, cruising, descent or landing of the aircraft (when the combustor is switched off and the turbines are not rotating or rotating at low revolutions per minute). In one or more further examples, the fuel cell provides supplemental power to the fan and or the HPC during take-off or climbing of the aircraft. In one or more examples when the combustor is operating, the turbine revolutions per minute is sufficient to meet the fan and HPC power requirements.

B4. The method comprising controlling driving speed of and air flow into, the compressors during one or more of the phases of flight (taxi, take-off, climb, cruise, or descent). In one or more examples, the LPC (booster) and HPC are operated at lower speeds and with higher flow of air (but lower pressure) using the fuel cell, as compared to when the LPC and HPC are directly driven by a turbine, because the fuel cell combustion reaction is different than combustor combustion reaction. In one or more examples, the LPC and HPC are operated at the optimum revolutions per minute for satisfying thrust output requirements from the fan and flow and pressure requirements for the booster and HPC. In one or more further examples, the compressors are driven at the speed optimized or tailored for meeting compressed air requirements of the fuel cell reacting the fuel with the compressed air (independent of the requirements of the combustor).

B5. The method comprising supplying at least one of the cabin (or air conditioning system supplying air to the cabin) with the compressed air discharged from the compressors (e.g., HPC) during one or more of the phases of flight or taxiing.

B6. The method comprising cooling the turbine(s) when the propulsor is being powered entirely by the fuel cell, wherein turbine blades are cooled once fuel flow to combustor is turned off.

B7. The method wherein the fuel reacted in the combustor and the fuel cell comprises hydrogen.

B8. A method of generating thrust (140), comprising:
reacting a fuel (114) using compressed air (108) outputted from a compressor (104) in a hybrid gas turbine engine (100), wherein the reacting is used to generate an exhaust (112, 138) gas providing thrust (148, 140) for an aircraft (900), the reacting further comprising:
reacting the fuel (114) in a fuel cell (122) so as to generate electricity used to power at least one of:
  a fan (132) generating thrust (140) during a cruise of the aircraft (900), or
  the compressor comprising an HP compressor (108) during a take-off of the aircraft (900); and
burning (combusting) the fuel (114) in a combustor (110) in the gas turbine engine (100) during take-off of the aircraft (900), so as to generate the exhaust comprising exhaust gas (112) through combustion of the fuel (114).

B9. The method of paragraph B8, further comprising using the exhaust gas (112) to generate electric power used to drive the compressor (108) outputting compressed air (108) to the combustor (110) during a take-off of the aircraft (900).

11. Processing Environment

Figure 12:
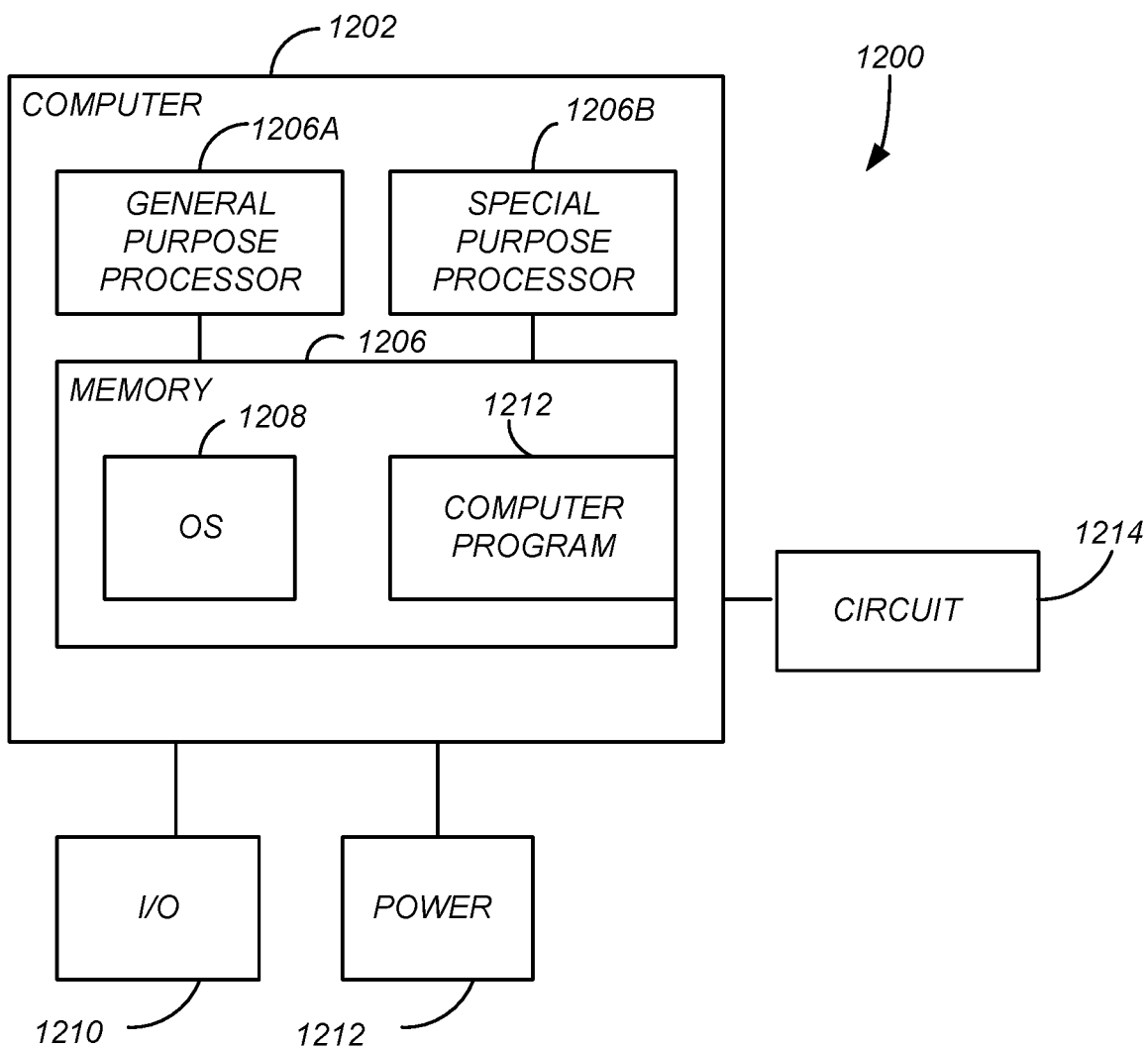
FIG. 12 illustrates a hardware environment for controlling the propulsor according to one or more examples described herein.

FIG. 12 illustrates an exemplary system 1200 used to implement processing elements needed to control the propulsor. In other examples, the system 1200 is a flight control system used to control the clutches and electrical machines and circuits that power the propulsor as described herein.

The computer 1202 comprises a processor 1204 (general purpose processor 1206A and special purpose processor 1206B) and a memory 1206, such as random access memory (RAM). Generally, the computer 1202 operates under control of an operating system 1208 stored in the memory 1206, and interfaces with the user/other computers to accept inputs and commands (e.g., analog or digital signals from the crew or flight control system) and to present results through an input/output (I/O) module 1210. The computer program application 1212 accesses and manipulates data stored in the memory 1206 of the computer 1202. The operating system 1208 and the computer program 1212 are comprised of instructions which, when read and executed by the computer 1202, cause the computer 1202 to perform the operations and/or methods herein described. In one embodiment, instructions implementing the operating system 1208 and the computer program 1212 are tangibly embodied in the memory 1206, thereby making one or more computer program products or articles of manufacture capable of controlling the propeller torque applied to the propeller assembly as described herein. As such, the terms "article of manufacture," "program storage device" and "computer program product" as used herein are intended to encompass a computer program accessible from any computer readable device or media. Also shown is a source of power 1212 for the computer.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An aircraft propulsion system comprising:
a first compressor;
a second compressor coupled to the first compressor to receive a first compressed air outputted from the first compressor and compress the first compressed air into a second compressed air;
a combustor positioned downstream of the second compressor to receive the second compressed air outputted from the second compressor, the combustor outputting a first exhaust gas formed from a fuel burned with the second compressed air;
a turbine positioned downstream of the combustor to receive the first exhaust gas;
a shaft connected to the turbine and the first compressor, the shaft transferring power from the turbine, driven by the first exhaust gas, to the first compressor forming the first compressed air;
a high pressure (HP) electric motor connected to the second compressor via a high pressure (HP) shaft, when the second compressor is dis-engaged from the shaft via a clutch,
wherein the HP shaft is concentric about the shaft and positioned entirely upstream of the combustor; and
a fuel cell connected to the HP electric motor, the fuel cell configured to react the second compressed air with the fuel to generate HP electric power used to power the HP electric motor driving the second compressor to form the second compressed air when the second compressor is dis-engaged from the shaft via the clutch.

2. The aircraft propulsion system of claim 1, further comprising:
a generator connected to the shaft to generate electric power from the power transferred from the turbine; and
a circuit transmitting the electric power from the generator to the HP electric motor to power the HP electric motor driving the second compressor.

3. An aircraft propulsion system comprising:
a first compressor;
a second compressor coupled to the first compressor to receive a first compressed air outputted from the first compressor and compress the first compressed air into a second compressed air;
a combustor positioned downstream of the second compressor to receive the second compressed air outputted from the second compressor, the combustor outputting a first exhaust gas formed from a fuel burned with the second compressed air;
a turbine positioned downstream of the combustor to receive the first exhaust gas;
a shaft connected to the turbine and the first compressor, the shaft transferring power from the turbine, driven by the first exhaust gas, to the first compressor forming the first compressed air;
a high pressure (HP) electric motor connected to the second compressor via a high pressure (HP) shaft, wherein the HP shaft is concentric about the shaft and positioned entirely upstream of the combustor;
a fuel cell connected to the HP electric motor, the fuel cell configured to react the second compressed air with the fuel to generate HP electric power used to power the HP electric motor driving the second compressor to form the second compressed air;
a nacelle;
a duct between a core and the nacelle, the core comprising the second compressor, the combustor, and the turbine;
a fan coupled to the first compressor and the duct to draw:
a first portion of air into the duct to generate a second exhaust outputted from the duct, the second exhaust providing a thrust for an aircraft propelled using the aircraft propulsion system, and
a second portion of the air into the first compressor, wherein the first compressor compresses the second portion of the air to form the first compressed air inputted to the second compressor meeting the second compressor to the shaft in a first configuration when the turbine second compressor via the shaft; and
a clutch:
connecting the second compressor to the shaft in a first configuration when the turbine drives the second compressor via the shaft; and
dis-engaging the shaft from the second compressor in a second configuration.

4. The aircraft propulsion system of claim 3, further comprising:
a low pressure (LP) electric motor;
a first low pressure (LP) shaft connected to the fan and the first compressor;
the shaft comprising a second low pressure (LP) shaft;
an LP clutch connected to the second LP shaft and the first LP shaft; and
the first configuration further comprising the combustor burning the fuel to form the first exhaust gas and the LP clutch connecting the first LP shaft to the second LP shaft so that the first LP shaft and the second LP shaft transfer the power from the turbine, driven by the first exhaust gas, to the first compressor and the fan; and
the second configuration comprising the fuel cell reacting the fuel with the second compressed air, the LP clutch disengaging the first LP shaft from the second LP shaft, and the LP electric motor driving the fan and the first compressor via the first LP shaft.

5. The aircraft propulsion system of claim 4, further comprising:
one or more circuits; and
a computer system instructing:
activation of the second configuration during a cruise of the aircraft, the second configuration further comprising the one or more circuits electrically connecting the LP electric motor to the fuel cell and the fuel cell powering the LP electric motor via the one or more circuits, and
activation of the first configuration during a take-off of the aircraft.

6. The aircraft propulsion system of claim 1, further comprising:
the clutch comprising an LP-HP clutch:
connecting the second compressor in the first configuration to the shaft during a take-off of an aircraft propelled using the aircraft propulsion system; and
dis-engaging the shaft from the second compressor in the second configuration during a cruise of the aircraft.

7. The aircraft propulsion system of claim 6, further comprising a gearing connected to the second compressor to adjust a torque output of the turbine transferred to the second compressor.

8. An aircraft propulsion system, comprising:
a first compressor,
a second compressor coupled to the first compressor to receive a first compressed air outputted from the first compressor and compress the first compressed air into a second compressed air;
a combustor positioned downstream of the second compressor to receive the second compressed air outputted from the second compressor, the combustor outputting a first exhaust gas formed from a fuel burned with the second compressed air;
a turbine positioned downstream of the combustor to receive the first exhaust gas;
a shaft connected to the turbine and the first compressor, the shaft transferring power from the turbine, driven by the first exhaust gas, to the first compressor forming the first compressed air;
an HP electric motor connected to the second compressor; and
a fuel cell connected to the HP electric motor, the fuel cell configured to react the second compressed air with the fuel to generate HP electric power used to power the HP electric motor driving the second compressor via the second shaft to form the second compressed air; and
one or more clutches:
dis-engaging at least one of the first compressor or the second compressor from the shaft in a first configuration, the first configuration further comprising:
the fuel cell reacting the fuel with the second compressed air to generate the HP electric power powering the HP electric motor driving the second compressor, and
the combustor not outputting an amount of the first exhaust gas sufficient to generate thrust propelling an aircraft coupled to the aircraft propulsion system;
coupling at least one of the first compressor or the second compressor to the shaft in a second configuration further comprising:
the combustor burning the fuel with the second compressed air to generate the first exhaust gas driving the turbine and
the turbine driving the second compressor via the shaft.

9. The aircraft propulsion system of claim 8, wherein each of the clutches comprise a sprag clutch.

10. The aircraft propulsion system of claim 9, further comprising:
a diverter regulating flow of the second compressed air outputted from the second compressor into the combustor or the fuel cell.

11. The aircraft propulsion system of claim 10, wherein:
the diverter comprises a valve connected to at least one of the second compressor or the combustor,
the valve is open in the first configuration allowing output of the second compressed air to the combustor, and
the valve is closed in the second configuration blocking flow of the second compressed air to the combustor.

12. The aircraft propulsion system of claim 11, wherein the valve comprises a sleeve valve or a combustor inlet valve.

13. The aircraft propulsion system of claim 10, further comprising a nozzle directing the first exhaust gas to produce the thrust propelling the aircraft, wherein:
the nozzle includes a variable core nozzle,
the diverter comprises the variable core nozzle or a variable turbine nozzle,
the diverter is open in the first configuration to allow flow of the first exhaust gas out of the nozzle to produce the thrust, and
the diverter is closed in the second configuration to divert the flow of the second compressed air to the fuel cell.

14. The aircraft propulsion system of claim 10, wherein the diverter is positioned:
in the second compressor, or
downstream of the second compressor and upstream of the combustor.

15. The aircraft propulsion system of claim 10, wherein the diverter comprises an adjustable vane in, or coupled to, the second compressor, the adjustable vane:
in the second configuration, diverting flow of the second compressed air to the fuel cell and blocking flow of the second compressed air downstream to the combustor, and
in the first configuration, allowing flow of the second compressed air downstream to the combustor.

16. The aircraft propulsion system of claim 10, further comprising:
a nacelle;
a fan coupled to a core comprising the second compressor, the combustor, the turbine, and an HP turbine downstream of the combustor;
a duct between the core and the nacelle;
an LP electric motor connected to the fuel cell;
a plurality of drive shafts including a first LP shaft, the shaft comprising a second LP shaft, a first HP shaft, and a second HP shaft;
the clutches including an LP clutch and an HP clutch;
the first configuration further comprising:
the LP clutch coupling the first LP shaft and the second LP shaft,
the turbine comprising an LP turbine, driven by the first exhaust gas, driving the first compressor and the fan via the first LP shaft and the second LP shaft,
the HP clutch coupling the first HP shaft and the second HP shaft, and the HP turbine, driven by the first exhaust gas in the first configuration, driving the second compressor via the first HP shaft and the second HP shaft; and
the second configuration further comprising:
the LP clutch dis-engaging the first LP shaft and the second LP shaft and the fuel cell powering the LP electric motor to drive the fan so that the fan draws:
a first portion of air into the duct to generate a second exhaust outputted from the duct, the second exhaust providing the thrust to the aircraft propelled using the aircraft propulsion system, and
a second portion of the air into the first compressor so as to form the first compressed air,
the HP clutch disengaging the first HP shaft from the second HP shaft, and the fuel cell powering the HP electric motor to drive the second compressor via the first HP shaft.

17. The aircraft propulsion system of claim 16, further comprising:
a computer instructing:
activation of the first configuration during at least one of a take-off or climb of the aircraft; and activation of the second configuration during at least one of a cruise, taxiing, descent, or landing of the aircraft.

18. The aircraft propulsion system of claim 16, wherein:
the fan comprises a plurality of first blades and the second compressor comprises a plurality of second blades,
a computer controls a first angular velocity of the plurality of first blades to generate the second exhaust needed for the thrust during cruise of the aircraft, and
the computer controls a second angular velocity of the second blades so as to provide sufficient flow and pressure of the second compressed air to the fuel cell needed to generate the HP electric power consumed by the HP motor and the LP electric motor during the cruise of the aircraft powered using the second exhaust.

19. The aircraft propulsion system of claim 9, further comprising:
an engine bleed air system coupled to the second compressor,
the second configuration further comprising the engine bleed air system conveying the second compressed air from the second compressor to the fuel cell, or
an aircraft system coupled to the engine bleed air system and the engine bleed air system conveying a first portion of the second compressed air to the fuel cell and a second portion of the second compressed air to the aircraft system for pressurizing a cabin in the aircraft.

20. The aircraft propulsion system of claim 19, further comprising the engine bleed air system:
coupled to at least one of the second compressor or the first compressor so as to obtain engine bleed air comprising at least a portion of the second compressed air or the first compressed air,
coupled to at least one of:
a low temperature heat exchanger configured to cool at least a portion of the engine bleed air to one or more temperatures suitable for aircraft use; or
a fuel heat exchanger configured to transfer heat from the engine bleed air to the fuel comprising liquid hydrogen, so that the heat boils the liquid hydrogen into a gas suitable for burning in the combustor or reaction in the fuel cell to generate the HP electric power.

* * * * *